US012627536B2

(12) United States Patent
Honkala et al.

(10) Patent No.: US 12,627,536 B2

(45) Date of Patent: May 12, 2026

(54) RADIO RECEIVER

(71) Applicant: Nokia Solutions and Networks Oy, Espoo (FI)

(72) Inventors: Mikko Johannes Honkala, Espoo (FI); Dani Johannes Korpi, Helsinki (FI); Janne Matti Juhani Huttunen, Espoo (FI); Vesa Starck, Helsinki (FI)

(73) Assignee: Nokia Technologies Oy, Espoo (FI)

( * ) Notice: Subject to any disclaimer, the term of this patent is extended or adjusted under 35 U.S.C. 154(b) by 454 days.

(21) Appl. No.: 18/033,836

(22) PCT Filed: Sep. 21, 2021

(86) PCT No.: PCT/EP2021/075861

§ 371 (c)(1),
(2) Date: Apr. 26, 2023

(87) PCT Pub. No.: WO2022/073752

PCT Pub. Date: Apr. 14, 2022

(65) Prior Publication Data

US 2023/0403182 A1 Dec. 14, 2023

(30) Foreign Application Priority Data

Oct. 8, 2020 (FI) ...................................... 20205990

(51) Int. Cl.
H04L 25/03 (2006.01)
H04B 7/0413 (2017.01)
(Continued)

(52) U.S. Cl.
CPC ..... H04L 25/03165 (2013.01); H04B 7/0413 (2013.01); H04L 5/0048 (2013.01);
(Continued)

(58) Field of Classification Search
CPC ................ H04B 7/0413; H04L 5/0048; H04L 5/0098; H04L 25/0224; H04L 25/0254; H04L 25/03165; H04L 27/26134
See application file for complete search history.

(56) References Cited

U.S. PATENT DOCUMENTS 6,151,369 A * 11/2000 Ohkubo ................... H04B 1/30
375/332
2019/0149201 A1* 5/2019 Meilhac ............... H04B 7/0615
375/267

(Continued)

OTHER PUBLICATIONS

Mohanty et al., "Neural Network and Sparse Block Processing Based Nonlinear Adaptive Equalizer for MIMO OFDM Communication Systems," TENCON 2018-2018 IEEE Region 10 Conference, Jeju, Korea (South), 2018, pp. 0224-0228, doi: 10.1109/TENCON.2018.8650367 (Year: 2018).*

(Continued)

*Primary Examiner* — Brian P Cox

(74) *Attorney, Agent, or Firm* — McCarter & English LLP

(57) ABSTRACT

According to an example embodiment, a radio receiver is configured to: obtain a data array including a plurality of elements, wherein each element in the plurality of elements in the data array corresponds to a sub-carrier in a plurality of subcarriers, to a timeslot in a time interval, and to an antenna stream; implement a machine learning model including at least one neural network and a transformation, wherein the transformation includes at least one multiplicative layer or equalisation; and input data into the machine learning model, wherein the data includes at least the data array; wherein the machine learning model is configured to, based on the data, output an output array representing values of the plurality of elements in the data array, wherein the values include bits or symbols. A radio receiver, a method and a computer program product are disclosed.

15 Claims, 11 Drawing Sheets

(51) Int. Cl.

| | |
|---|---|
| *H04L 5/00* | (2006.01) |
| *H04L 25/02* | (2006.01) |
| *H04L 27/26* | (2006.01) |

(52) U.S. Cl.

CPC ........ *H04L 5/0098* (2013.01); *H04L 25/0224* (2013.01); *H04L 25/0254* (2013.01); *H04L 27/26134* (2021.01)

(56) References Cited

U.S. PATENT DOCUMENTS

| | | | | |
|---|---|---|---|---|
| 2021/0041548 A1* | 2/2021 | Chen | ..................... | G01S 13/003 |
| 2023/0325638 A1* | 10/2023 | Kim | ........................ | H03M 9/00 |

OTHER PUBLICATIONS

Zhao, Z. et al., "Deep-Waveform: A Learned OFDM Receiver Based on Deep Complex Convolutional Networks," arxiv.org, Cornell University Library, 201 Online Library Cornell University, Ithaca, NY, Oct. 16, 2018.

Honkala, M. et al., "DeepRx: Fully Convolutional Deep Learning Receiver," arxiv.org, Cornell University Library, 201 Online Library Cornell University, Ithaca, NY, May 4, 2020.

Purkayastha, G. K., et al., "Maximal Ratio Combining using ANN-assisted equalization in wireless channels," 2012 $2^{nd}$ National Conference on Computational Intelligence and Signal Processing (CISP), Mar. 2, 2012, Abstract only.

Zhou, Zhou, et al., "Learning for Detection: MIMO-OFDM Symbol Detection through Downlink Pilots", IEEE Transactions On Wireless Communications, vol. 19, No. 6, Jun. 2020, pp. 3712-3726.

* cited by examiner

RADIO RECEIVER

TECHNICAL FIELD

The present application generally relates to the field of wireless communications. In particular, the present application relates to a radio receiver device for wireless communication, and related methods and computer programs.

BACKGROUND

Radio receiver algorithms may comprise blocks that are based on mathematical and statistical algorithms. These algorithms may be developed and programmed manually, which may be labour intensive. For example, it requires large amounts of manual labour to implement different reference signal configurations. Receiver algorithms designed this way may perform adequately for most channel conditions but may not give the best possible performance for any of the channels. It may also be difficult to estimate how algorithms developed based on theoretical channel conditions align with actual physical channel conditions. Multiple-input and multiple-output (MIMO) radio receivers can introduce additional challenges, since the nature of MIMO detection can require separating multiple overlapping spatial streams.

SUMMARY

The scope of protection sought for various example embodiments of the invention is set out by the independent claims. The example embodiments and features, if any, described in this specification that do not fall under the scope of the independent claims are to be interpreted as examples useful for understanding various example embodiments of the invention.

An example embodiment of a radio receiver comprises at least one processor and at least one memory comprising computer program code. The at least one memory and the computer program code are configured to, with the at least one processor, cause the radio receiver to: obtain a data array comprising a plurality of elements, wherein each element in the plurality of elements in the data array corresponds to a subcarrier in a plurality of subcarriers, to a timeslot in a time interval, and to an antenna stream; implement a machine learning model comprising at least one neural network and a transformation, wherein the transformation comprises at least one multiplicative layer or equalisation; and input data into the machine learning model, wherein the data comprises at least the data array; wherein the machine learning model is configured to, based on the data, output an output array representing values of the plurality of elements in the data array, wherein the values comprise bits or symbols. The radio receiver may be able to, for example, efficiently receiver the transmission. The machine learning model can be trained to receive the transmission with a high degree of flexibility.

An example embodiment of a radio receiver comprises means for performing: obtain a data array comprising a plurality of elements, wherein each element in the plurality of elements in the data array corresponds to a subcarrier in a plurality of subcarriers, to a timeslot in a time interval, and to an antenna stream; implement a machine learning model comprising at least one neural network and a transformation, wherein the transformation comprises at least one multiplicative layer or equalisation; and input data into the machine learning model, wherein the data comprises at least the data array; wherein the machine learning model is configured to, based on the data, output an output array representing values of the plurality of elements in the data array, wherein the values comprise bits or symbols.

In an example embodiment, alternatively or in addition to the above-described example embodiments, the machine learning model comprises a neural network component before the transformation and a neural network component after the transformation. The neural network component before the transformation may, for example, process the data to be more easily processable for the transformation and the neural network component after the transformation may, for example, perform bit/symbol detection.

In an example embodiment, alternatively or in addition to the above-described example embodiments, the neural network component before the transformation is configured to perform processing between elements in the data array corresponding to different subcarriers and/or to different timeslots. Thus, the neural network component before the transformation may mix different resource elements. This may improve the performance of the transformation and/or of the radio receiver.

In an example embodiment, alternatively or in addition to the above-described example embodiments, the equalisation comprises maximal-ratio combining. The radio receiver may be able to, for example, efficiently perform the equalisation.

In an example embodiment, alternatively or in addition to the above-described example embodiments, the multiplicative layer is configured to multiply together elements in the data array layers. Thus, the multiplicative layer may be able to perform multiplication between elements, which may be difficult to implement using neural networks.

In an example embodiment, alternatively or in addition to the above-described example embodiments, the multiplicative layer is further configured to complex conjugate at least one of the elements to be multiplied before the multiplication. Thus, the multiplicative layer may be able to perform complex conjugation of elements and multiplication between elements, which may be difficult to implement using neural networks.

In an example embodiment, alternatively or in addition to the above-described example embodiments, the multiplicative layer is configured to scale an imaginary part and/or a real part separately from each other of at least one element in the data array. Thus, the multiplicative layer may be able to perform scaling of the imaginary part and/or complex conjugation, which may be difficult to implement using neural networks.

In an example embodiment, alternatively or in addition to the above-described example embodiments, the multiplicative layer is configured to perform a sparse expansion on the data array. Thus the multiplicative layer may select and/or learn to select the elements that should be multiplied.

In an example embodiment, alternatively or in addition to the above-described example embodiments, the at least one neural network comprises a convolutional neural network. The at least one neural network may be able to, for example, efficiently process the data.

In an example embodiment, alternatively or in addition to the above-described example embodiments, the at least one memory and the computer program code are further configured to, with the at least one processor, cause the radio receiver to: obtain a reference signal array representing a reference signal configuration applied during the time interval, and wherein the data further comprises the reference signal array; or obtain a reference signal array representing a reference signal configuration applied during the time interval and compute a channel estimate based on the data array and the reference signal array, and wherein the data further comprises channel estimate. The radio receiver may be able to, for example, efficiently utilise the reference signal information in receiving the MIMO transmission.

In an example embodiment, alternatively or in addition to the above-described example embodiments, the reference signal array comprises a plurality of channels, wherein each channel corresponds to a layer of a MIMO transmission. The radio receiver may be able to, for example, efficiently utilise the reference signal information in receiving the layers of the MIMO transmission.

In an example embodiment, alternatively or in addition to the above-described example embodiments, the at least one memory and the computer program code are further configured to, with the at least one processor, cause the radio receiver to perform the obtaining the data array by performing: receive raw data using a plurality of samples during the time interval; and perform a Fourier transform on the received raw data, producing the data array. The radio receiver may be able to, for example, receive the data array with a high degree of compatibility.

An example embodiment of a client device comprises the radio receiver according to any of the above-described example embodiments.

An example embodiment of a network node device comprises the radio receiver according to any of the above-described example embodiments.

An example embodiment of a method comprises: obtaining a data array comprising a plurality of elements, wherein each element in the plurality of elements in the data array corresponds to a sub-carrier in a plurality of subcarriers, to a timeslot in a time interval, and to an antenna stream; implementing a machine learning model com-prising at least one neural network and a transformation, wherein the trans-formation comprises at least one multiplicative layer or equalisation; and inputting data into the machine learning model, wherein the data comprises at least the data array; wherein the machine learning model is configured to, based on the data, output an output array representing values of the plurality of elements in the da-ta array, wherein the values comprise bits or symbols. The method may enable, for example, efficiently receiving the transmission. The machine learning model can be trained to receive the transmission with a high degree of flexibility.

In an example embodiment, alternatively or in addition to the above-described example embodiments, the machine learning model comprises a neural network component before the transformation and a neural network component after the transformation. The neural network component before the transformation may, for example, process the data to be more easily processable for the transformation and the neural network component after the transformation may, for example, perform bit/symbol detection.

In an example embodiment, alternatively or in addition to the above-described example embodiments, the neural net-work component before the transformation is configured to perform processing between elements in the data array corresponding to different subcarriers and/or to different timeslots. Thus, the neural network component before the transformation may mix different resource elements. This may improve the performance of the transformation and/or of the data reception.

In an example embodiment, alternatively or in addition to the above-described example embodiments, the equalisation comprises maximal-ratio combining. The method may enable, for example, efficiently performing the equalisation.

In an example embodiment, alternatively or in addition to the above-described example embodiments, the multiplicative layer is configured to multiply together elements in the data array layers. Thus, the multiplicative layer may be able to perform multiplication between elements, which may be difficult to implement using neural networks.

In an example embodiment, alternatively or in addition to the above-described example embodiments, the multiplicative layer is further configured to complex conjugate at least one of the elements to be multiplied before the multiplication. Thus, the multiplicative layer may be able to perform complex conjugation of elements and multiplication between elements, which may be difficult to implement using neural networks.

In an example embodiment, alternatively or in addition to the above-described example embodiments, the multiplicative layer is configured to scale an imaginary part and/or a real part separately from each other of at least one element in the data array. Thus, the multiplicative layer may be able to perform scaling of the imaginary part and/or complex conjugation, which may be difficult to implement using neural networks.

In an example embodiment, alternatively or in addition to the above-described example embodiments, the multiplicative layer is configured to perform a sparse expansion on the data array. Thus the multiplicative layer may select and/or learn to select the elements that should be multiplied.

In an example embodiment, alternatively or in addition to the above-described example embodiments, the at least one neural network comprises a convolutional neural network. The at least one neural network may be able to, for example, efficiently process the data.

In an example embodiment, alternatively or in addition to the above-described example embodiments, the method further comprises: obtaining a reference signal array representing a reference signal configuration applied during the time interval, and wherein the data further comprises the reference signal array; or obtaining a reference signal array representing a reference signal configuration applied during the time interval and computing a channel estimate based on the data array and the reference signal array, and wherein the data further comprises channel estimate. The method may enable, for example, efficiently utilising the reference signal information in receiving the MIMO transmission.

In an example embodiment, alternatively or in addition to the above-described example embodiments, the reference signal array comprises a plurality of channels, wherein each channel corresponds to a layer of a MIMO transmission. The method may enable, for example, efficiently utilising the reference signal information in receiving the layers of the MIMO transmission.

In an example embodiment, alternatively or in addition to the above-described example embodiments, the obtaining the data array comprises: receiving raw data using a plurality of samples during the time interval; and performing a Fourier transform on the received raw data, producing the data array. The method may enable, for example, receiving the data array with a high degree of compatibility.

An example embodiment of a method comprises:

An example embodiment of a computer program product comprises program code configured to perform the method according to any of the above example embodiments, when the computer program product is executed on a computer.

DESCRIPTION OF THE DRAWINGS

The accompanying drawings, which are included to pro-vide a further understanding of the example embodiments and constitute a part of this specification, illustrate example embodiments and together with the description help to explain the principles of the example embodiments. In the drawings.

Like reference numerals are used to designate like parts in the accompanying drawings.

DETAILED DESCRIPTION

Reference will now be made in detail to example embodiments, examples of which are illustrated in the accompanying drawings. The detailed description provided below in connection with the appended drawings is intended as a description of the present examples and is not intended to represent the only forms in which the present disclosure may be constructed or utilized. The description sets forth the functions of the example and the sequence of steps for constructing and operating the example. However, the same or equivalent functions and sequences may be accomplished by different example embodiments.

Figure 1:
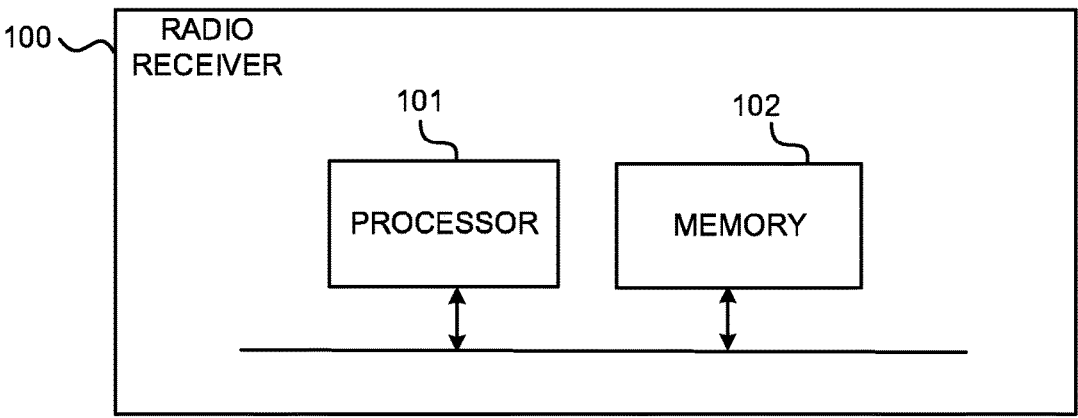
FIG. 1 illustrates an example embodiment of the subject matter described herein illustrating a radio receiver.

FIG. 1 is a block diagram of a radio receiver 100 configured in accordance with an example embodiment.

The radio receiver 100 may comprises one or more processors 101 and one or more memories 102 that comprise computer program code. The radio receiver 100 may also comprise at least one antenna port, as well as other elements, such as an input/output module (not shown in FIG. 1), and/or a communication interface (not shown in FIG. 1).

According to an example embodiment, the at least one memory 102 and the computer program code are configured to, with the at least one processor 101, cause the radio receiver 100 to obtain a data array comprising a plurality of elements, wherein each element in the plurality of elements in the data array corresponds to a subcarrier in a plurality of subcarriers, to a timeslot in a time interval, and to an antenna stream.

The antenna stream may refer to, for example, an antenna stream of a multiple-input and multiple-output, MIMO, or single-input and multiple-output, SIMO, or single-input and single-output SISO transmission The plurality of subcarriers may correspond to, for example, subcarriers of a code/resource block.

The time interval may correspond to, for example, a transmission time interval (TTI).

Herein, a resource element may refer to a specific subcarrier and a specific time interval. Thus, a resource element may correspond to a single element in the data array in the time-frequency plane. Each resource element may therefore comprise a plurality of MIMO layers.

The data may be transmitted using, for example, orthogonal frequency-division multiplexing (OFDM). Each subcarrier in the plurality of subcarriers may correspond to an OFDM subcarrier.

The data array may correspond to, for example a code block.

Each timeslot may correspond to one OFDM symbol in time domain.

Each element in the plurality of elements may correspond to, for example, a symbol in a symbol constellation. The symbol constellation may depend on the modulation scheme used for the received data.

A MIMO layer may refer to a data stream in a MIMO transmission. For example, a MIMO layer may correspond to data received from a specific client device by a base station. There can be several client devices that send data to a base station using the same frequency range, and the base station needs to separate these MIMO layers. This may be referred to as multi-user MIMO.

It is also possible that client device comprises several antennas and it sends several data streams simultaneously. Each antenna stream may correspond to a data stream received using one antenna or spatial stream received using antenna array. There are usually more antenna streams than MIMO layers, for example, 16×4 MIMO (16 antenna streams, 4 layers), otherwise separation of MIMO layers can be an impossible task.

The at least one memory 102 and the computer program code may be further configured to, with the at least one processor 101, cause the radio receiver 100 to implement a machine learning (ML) model comprising at least one neural network (NN) and a transformation. The transformation may comprise at least one multiplicative layer or equalisation.

The transformation may also be referred to as a pre-processing transformation, a pre-processing layer, or similar.

The multiplicative layer may also be referred to as a multiplicative transformation, multiplicative pre-processing, or similar.

The equalisation may also be referred to as an equalisation layer, equalisation transformation, or similar.

The maximal-ratio combining may also be referred to as MRC layer, MRC transformation, or similar.

The ML model may have been trained as disclosed herein.

The ML model may comprise, for example, one or more convolutional neural networks (CNNs). Alternatively or additionally, the ML model may comprise, for example, attention mechanisms and/or transformer neural networks, or recurrent networks.

According to an example embodiment, the at least one neural network comprises a convolutional neural network.

The at least one memory 102 and the computer program code may be further configured to, with the at least one processor 101, cause the radio receiver 100 to input data into the machine learning model, wherein the data comprises at least the data array.

The data may further comprise any other information as disclosed herein.

The data may comprise a three-dimensional array. A first dimension of the data may correspond to frequency, a second dimension of the data may correspond to time, and a third dimension of the data may correspond to a channel. The channel dimension of the data or of any other array disclosed herein may also be referred to as depth dimension or convolutional channel dimension. The third dimension of the data may correspond to different types of data.

The machine learning model may be configured to, based on the data, output an output array representing values of the plurality of elements in the data array, wherein the values comprise bits or symbols.

The output array may comprise, for example, log likelihood ratios (LLRs) or raw bit values.

The radio receiver 100 may perform the obtaining the data array by, for example, receiving raw data using a plurality of samples during the time interval and performing a Fourier transform on the received raw data, producing the data array.

The radio receiver 100 can facilitate the learning of a ML-based high-order MIMO receiver by adding a specific transformation into the processing chain of a ML model. The transformation can utilise multiplicative operations in order to solve the MIMO receiver problem.

The transformation can be thought of a way of injecting expert knowledge into ML-based radio receiver, which can be beneficial due to the challenging nature of detecting spatially multiplexed signals over a large number of antennas in MIMO. Otherwise, the computational burden due to the increased antenna dimensions of MIMO systems can be enormous and the accuracy of the system may not be as good as with the radio receiver 100 disclosed herein.

The transformation may comprise at least one multiplicative layer. The at least one multiplicative layer may be fully learned. Alternatively, the transformation may comprise an equaliser, such as the maximal-ratio combining (MRC). The MRC may optionally use learned virtual antenna streams.

Typical neural networks (including CNNs) can be built from blocks that combine a linear operation, such as matrix multiplication or convolution, with a nonlinear activation function, such as a Rectified Linear Unit (ReLu). One problem with neural networks may be that it can be difficult or inefficient to approximate multiplication of inputs using such blocks. An accurate approximation of such elementary calculation can require a large number of layers. This can be a problem especially in physical layer processing where several phenomena, such as channel estimation, are multiplicative in nature.

To overcome this limitation, the radio receiver 100 can utilise the transformation in the ML model in order to better handle multiplications of inputs. The transformation can be developed using expert knowledge of the underlying phenomena. The transformation can be also combined with some other trainable or differentiable receiver than those disclosed herein.

In at least some of the example embodiments disclosed herein, a crude estimate of the channel (raw channel estimate) may be needed. To this end, the radio receiver 100 may calculate the raw channel estimate and interpolate it over the whole time-frequency grid using, for example, a simple nearest neighbour interpolation.

Although the radio receiver 100 may be depicted to comprise only one processor 101, the radio receiver 100 may comprise more processors. In an example embodiment, the memory 102 is capable of storing instructions, such as an operating system and/or various applications.

Furthermore, the processor 101 may be capable of executing the stored instructions. In an example embodiment, the processor 101 may be embodied as a multicore processor, a single core processor, or a combination of one or more multi-core processors and one or more single core processors. For example, the processor 101 may be embodied as one or more of various processing devices, such as a coprocessor, a microprocessor, a controller, a digital signal processor (DSP), a processing circuitry with or without an accompanying DSP, or various other processing devices including integrated circuits such as, for example, an application specific integrated circuit (ASIC), a field programmable gate array (FPGA), a microcontroller unit (MCU), a hardware accelerator, a special-purpose computer chip, or the like. In an example embodiment, the processor 101 may be configured to execute hard-coded functionality. In an example embodiment, the processor 101 is embodied as an executor of software instructions, wherein the instructions may specifically configure the processor 101 to perform the algorithms and/or operations described herein when the instructions are executed.

The memory 102 may be embodied as one or more volatile memory devices, one or more non-volatile memory devices, and/or a combination of one or more volatile memory devices and non-volatile memory devices. For example, the memory 102 may be embodied as semiconductor memories (such as mask ROM, PROM (programmable ROM), EPROM (erasable PROM), flash ROM, RAM (random access memory), etc.).

The radio receiver 100 may be embodied in e.g. a mobile phone, a smartphone, a tablet computer, a smart watch, or any hand-held or portable device or any other apparatus, such as a vehicle, a robot, or a repeater.

The radio receiver 100 may be embodied in, for example, a network node device, such as a base station (BS). The base station may comprise, for example, a gNB or any such device providing an air interface for client devices to connect to the wireless network via wireless transmissions.

When the radio receiver 100 is configured to implement some functionality, some component and/or components of the radio receiver 100, such as the at least one processor 101 and/or the memory 102, may be configured to implement this functionality. Furthermore, when the at least one processor 101 is configured to implement some functionality, this functionality may be implemented using program code comprised, for example, in the memory 102. For example, if the radio receiver 100 is configured to perform an operation, the at least one memory 102 and the computer program code can be configured to, with the at least one processor 101, cause the radio receiver 100 to perform that operation.

Some terminology used herein may follow the naming scheme of 4G or 5G technology in its current form. However, this terminology should not be considered limiting, and the terminology may change over time. Thus, the following discussion regarding any example embodiment may also apply to other technologies.

Figure 2:
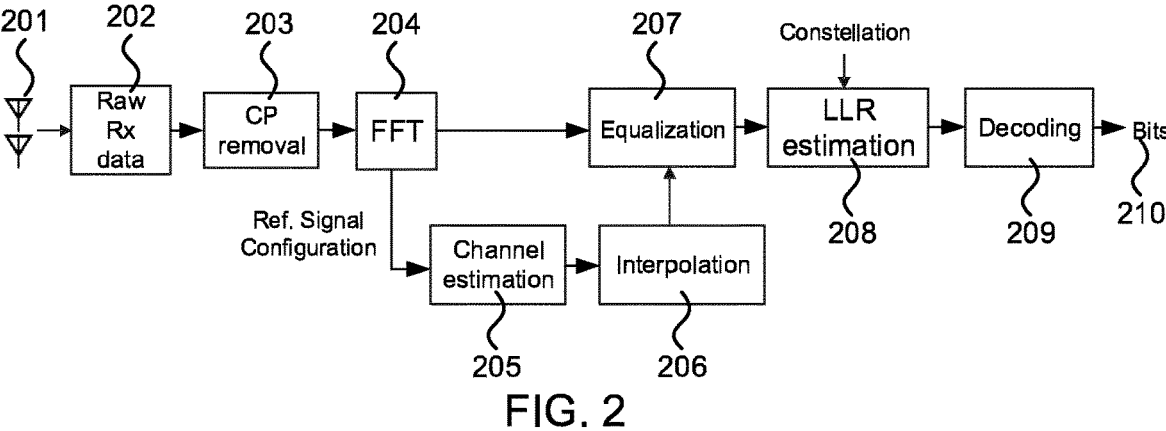
FIG. 2 illustrates a comparative example of the subject matter described herein illustrating block diagram of a radio receiver.

FIG. 2 illustrates a comparative example of the subject matter described herein illustrating block diagram of a radio receiver.

The radio receiver may be electrically coupled to one or more antennas 201. The radio receiver may obtain raw received data 202 form the one or more antennas 201. The radio receiver may be configured to remove 203 a cyclic prefix (CP) from the raw received data 202. The radio receiver 200 may be configured to perform a Fourier transform, using for example fast Fourier transform (FFT), on the raw received data 202.

The radio receiver may be configured to perform channel estimation 205 and interpolation 206 based on reference signal configuration.

The radio receiver may be configured to perform equalization 207 based on the Fourier transformed data and the channel estimates. After equalization 207, the radio receiver 200 may perform log likely hood ratio (LLR) estimation 208. Based on the LLR, the radio receiver 200 may decode 209 the bit values 210.

Figure 3:
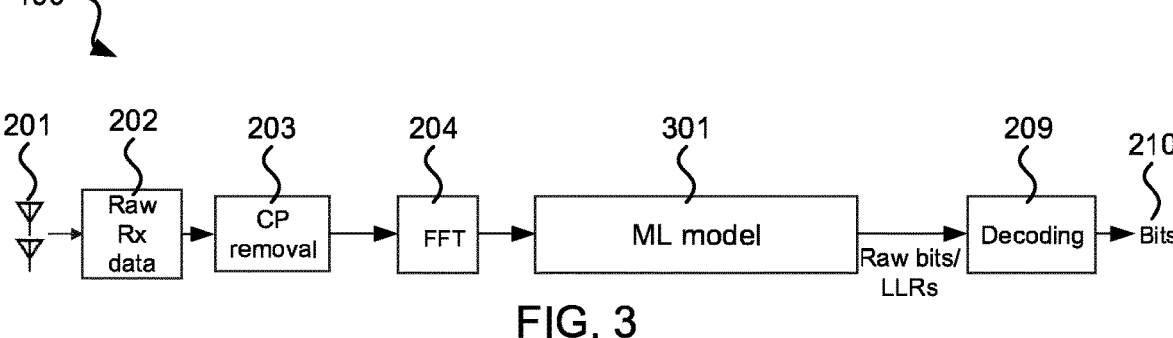
FIG. 3 illustrates an example embodiment of the subject matter described herein illustrating block diagram of a radio receiver comprising a machine learning model.

FIG. 3 illustrates an example embodiment of the subject matter described herein illustrating block diagram of a radio receiver 100.

As can be seen by comparing the example embodiment of FIG. 3 to the comparative example of FIG. 2, the machine learning (ML) model 301 may replace, for example, functional blocks 205-208. In some example embodiments, the ML model 301 may also replace some other functional blocks, such as the FFT block 204, of the radio receiver 100.

The ML model 301 may take in the partially processed received waveform and output the information as, for example, the log-likelihood ratios (LLRs) or directly the decoded bits. In the former case, a separate decoder 209 may be required to process the ML model output to obtain the information bits 210. For example, low-density parity check (LDPC) decoder may be needed to obtain 5G uplink shared channel (UL-SCH) data. The ML model 301 can be trained to perform at least some functionality of the radio receiver 100 by training with an appropriate training algorithm and training data.

The structure of the radio receiver 100 may allow fast and efficient implementation of the radio receiver 100 using ML chips and/or AI accelerators. It is also likely that under some circumstances, such as under particular channel conditions and/or with very sparse reference signal configurations, a ML-based radio receiver will result in improved performance.

Many radio transmitters and receivers are based on orthogonal frequency-division multiplexing, where the symbols are modulated onto orthogonal subcarriers. For instance, in 5G systems, OFDM is used both in the uplink (UL) and in the downlink (DL), such that it is possible to multiplex different users into adjacent subcarrier blocks (orthogonal frequency division multiple access, OFDMA).

The ML model 301 may implement channel estimation 205 (subcarrier demapping), equalization 207 and LLR estimation 208 (bit detection). Moreover, the radio receiver

100 may be able to handle flexible demodulation reference signal (DMRS) configurations, multi-layer MIMO, and various modulation schemes, such as quadrature phase shift keying (QPSK) or quadrature amplitude modulation (QAM).

The ML model 301 may be implemented at least partially using a convolutional neural network (CNN). The ML model 301 may take in the received data after FFT 204 and output LLRs or bit values. The CNN may be two dimensional and operate over the time and frequency axis. The CNN can simultaneously consider all subcarriers and symbols in a transmission time interval (TTI). This way, the convolutional filters in the CNN can implicitly handle correlations and/or impairments in time and frequency, which stem from the antenna configuration, multipath propagation, and mobility.

Sparse pilot symbols may only provide local information about the channel. It may be beneficial to allow the ML model to utilize the unknown data and its known distribution for improved LLR estimation further away from the pilot locations. Thus, the LLR estimation may be improved when both data and pilot signals are input to the ML model in a coherent fashion. This may allow the ML model to utilize both for carrying out LLR estimation. For example, the ML model may learn some version of an advanced iterative receiver scheme.

Figure 4:
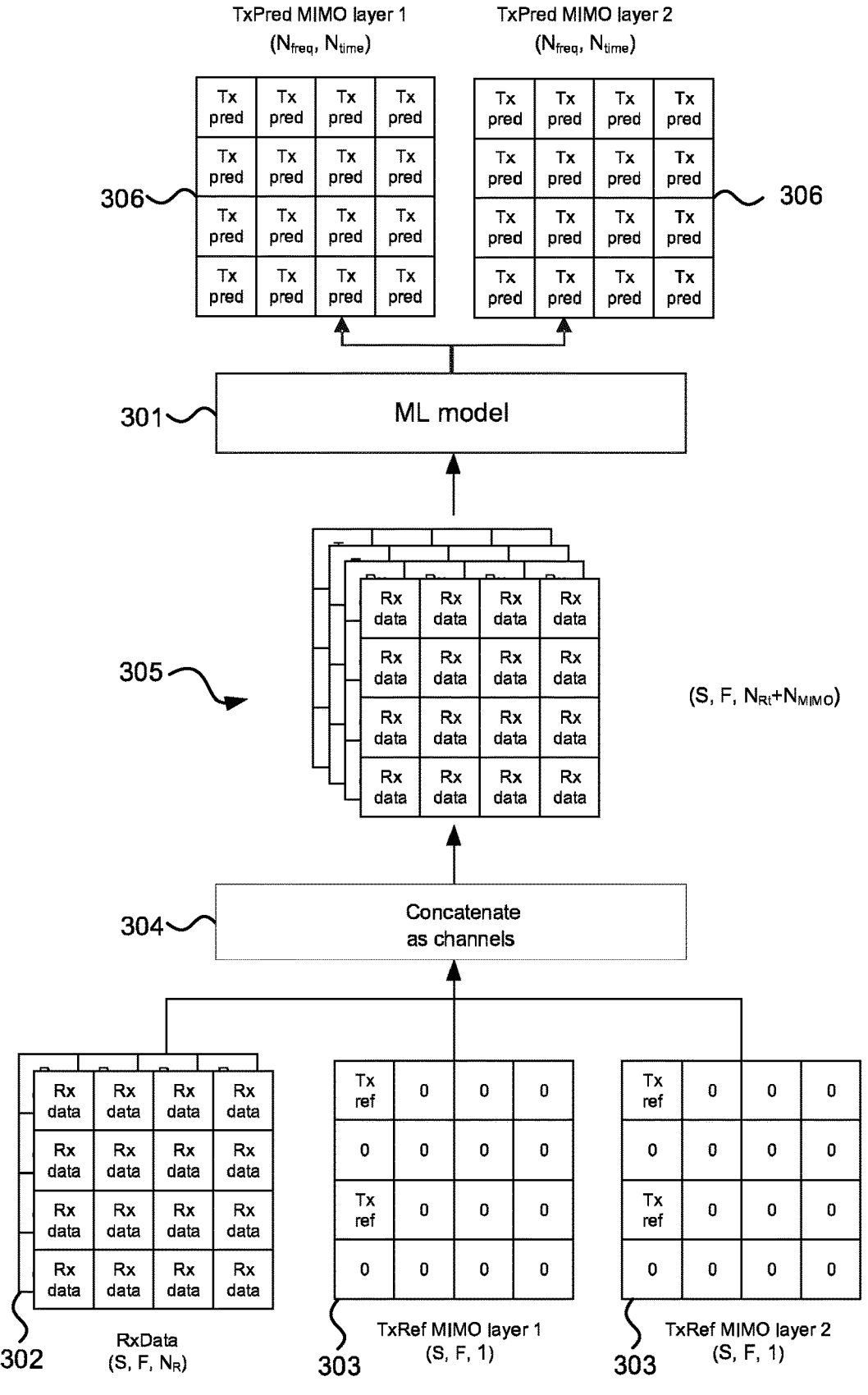
FIG. 4 illustrates an example embodiment of the subject matter described herein illustrating data flow into and out of a machine learning model.

FIG. 4 illustrates an example embodiment of the subject matter described herein illustrating data flow into and out of the ML model 301.

The radio receiver 100 may be configured to combine various information sources into the data 305 to be fed into the ML model 301. For example, the radio receiver 100 may concatenate 304 various information sources to form the data 305. After the concatenation 304, the various information sources may correspond to channels of the data 305. Thus, the information sources may be concatenated in the depth dimension of the data 305.

The data 305 may also be referred to as input data, ML model input data, or similar.

One-dimensional vectors and two-dimensional matrices may be expanded to three-dimensional arrays. Thus, a single three-dimensional array may be formed as the data 305.

The data 305 may comprise the data array 302. The data array 302 may be received Fourier transformed data. The data array 302 may be obtained as the output of FFT 204 in the example embodiment of FIG. 3.

The data array 302 may be represented as a three-dimensional array with dimensions S (number of timeslots in the time interval)×F (number of subcarriers in the plurality of subcarriers)×$N_R$ (the number of antenna streams). F may be, for example, 14 in 5G.

The data array 302 may comprise a plurality of channels and data from a plurality of antenna streams, wherein each channel in the data array 302 corresponds to an antenna stream in the plurality of antenna streams. Each antenna stream may correspond to a MIMO layer. The channels may also be referred to as input channels, convolutional channels, or similar.

The at least one memory and the computer program code may be further configured to, with the at least one processor, cause the radio receiver 100 to obtain a reference signal array 303 representing a reference signal configuration applied during the time interval. The data 305 may further comprise the reference signal array 303.

According to an example embodiment, the reference signal array 303 comprises a plurality of channels, wherein each channel corresponds to a layer of the MIMO transmission.

The reference signal array 303 may represent reference signals (pilot configuration) that are applied during the time interval. The reference signal array 303 may be used for channel estimation. For example, a single user case, the dimensions of the reference signal array 303 may be S×F.

The reference signal array 303 may comprise a plurality of reference signals, wherein a location in the reference signal array of each reference signal in the plurality of reference signals indicates a subcarrier of the reference signal and a timeslot of the reference signal. For example, in the example embodiment of FIG. 4, the reference signal array 303 comprises two reference signals.

The reference signal array 303 may further comprise a preconfigured indicator value in each location of the reference signal array 303 not comprising a reference signal. The preconfigured indicator value may indicate that the corresponding element of the reference signal array 303 does not comprise a reference signal. For example, in the example embodiment of FIG. 4, the reference signal array 303 comprises zeros as the preconfigured indicator values.

An element of the reference signal array 303 may be non-zero if the corresponding subcarrier and timeslot is a reference signal. The values of the nonzero elements may be filled with the reference signal values.

For MIMO, the reference signal array 303 may be three-dimensional. Reference signal configurations for each MIMO layer using the same subcarrier frequency can be stacked in the depth dimension.

The reference signal array 303 may comprise a plurality of channels, wherein each channel in the plurality of channels in the reference signal array 303 corresponds to a layer of a MIMO transmission. The layers may be, for example, from a single user MIMO or mixed single- and multi-user MIMO.

In the example embodiment of FIG. 4, the data array 302 comprises two channels. Each channel may correspond to a separate antenna stream. Furthermore, the reference signal array 303 comprises two channels. Each channel may correspond to a MIMO layer.

The antenna streams of the data array 302 and the MIMO layers of the reference signal array 303 may be concatenated into the data 305.

The ML model 301 may output LLRs 210 for each MIMO layer based on the data 305.

The example embodiment of FIG. 4 may apply to multi-user MIMO or single-user MIMO. In multi-user MIMO, the number of MIMO layers may correspond to the number of MIMO users.

The at least one memory and the computer program code may be further configured to, with the at least one processor, cause the radio receiver to obtain a frequency array representing subcarrier frequencies of the plurality of subcarriers. The data 305 may further comprise the frequency array.

By feeding the frequencies of the subcarriers to the ML model 301, it may also be possible to process one time interval in multiple blocks over the frequency axis. This approach can be used to limit the size of the ML model 301 if computational resources of radio receiver 100 are not sufficient to process whole time interval at once. Further, the physical properties of a wireless channel can depend on the frequency band. Thus, it may also be beneficial to allow the ML model 301 to utilize this information.

Dimensions of the frequency array may be $N_{freq} \times 1$. The frequency array may comprise a vector representing subcarrier frequencies. This may provide information about the subcarrier frequencies for the ML model 301. This may allow the network to specialize some lower level filters to act differently based on the subcarrier frequency. The frequency array may also add the capability to process any part of the frequencies separately, for instance because of hardware or load requirements.

The data 305 may comprise a plurality of channels.

At least one channel in the plurality of channels of the data 305 may correspond to the reference signal array.

At least one channel in the plurality of channels of the data 305 may correspond to the frequency array.

The data 305 may further comprise other information. The other information may comprise, for example, information about the encoding, UE identifier, UE scheduling information etc.

After the concatenation 304, the dimensions of the data 305 may be $S \times F \times N_{ch}$, where $N_{ch}$ is the number of channels. The number of channels may also be referred to as depth. Thus, after the concatenation 304, different data types, such as the data array 302, the reference signal array 303, and the frequency array, may be stacked in the channel/depth dimension of the data 305.

The ML model 301 may comprise at least one two-dimensional convolutional layer operating in time and frequency directions. The ML model 301 may comprise a plurality of such convolutional layers.

Each convolutional layer in the ML model 301 may comprise k filters. The depth of each filter may be equal to the depth of the input of that layer. For example, the depth of each filter in the first layer of the ML model 301 may be $N_{ch}$. Thus, when the each of the k filters is convoluted with the data 305 in the frequency and time dimensions, a new three-dimensional array 506 of size $N_{freq} \times N_{time} \times k$ may be produced.

Each filter in the ML model 301 may be, for example, of size 3×3 or of any other size.

The ML model 301 may comprise, for example 10-20 convolutional layers.

In the convolution operations of the ML model 301 zero padding may be used. Alternative padding schemes, such as period padding, may also be used. In some cases, it may be beneficial to use such a padding that the S and F dimensions remain constant through the ML model 301.

In the convolution operations of the ML model 301, after two-dimensional convolutions in the frequency and time dimensions, the results may be summed over the channel direction.

Alternatively or additionally, other type of convolution operations, such as depth wise separable convolution, may be implemented in the ML model 301. The ML model 301 may further comprise nonlinearity, such as Rectified Linear Unit (ReLU), and possible normalization, such as batch normalization during training. Each convolutional layer in the ML model 301 may comprise a ReLU and/or other nonlinearity.

Each layer in the ML model 301 may comprise distinct weights. The weights may correspond to the elements of the filters. Weight may also be referred to as parameter, model parameter, or similar.

Convolutions may make it possible to handle correlations and/or impairments in time and frequency due to, for example, antenna configuration and mobility of UE (Doppler shift/spread). Convolutions may also improve interpolation of channel information over the time interval, since the channel estimates should be interpolated over those subcarriers and symbols where the actual data symbols are transmitted.

The ML model 301 may further comprise at least one residual block.

The output of the final convolutional layer can be fed to a 1×1 convolution that combines the output channels from two-dimensional convolutional layers producing bit LLRs 210. The 1×1 convolutional layer may have $N_{MIMO}×N_{bit}$ output channels, where $N_{MIMO}$ is the number of MIMO layers and $N_{bit}$ is the maximum number of bits per symbol. For example, for support up to 256QAM, $N_{bit}=8$.

The output of the ML model 301 may be reshaped to $S×F×N_{MIMO}×N$ bit elements and each element can be fed into the sigmoid function. The sigmoid function can output the output the probability of each bit being 1. The output array may comprise these probabilities.

Since the outputs of the sigmoid layer are the bit probabilities, the input to the sigmoid layer corresponds to LLRs with a possible multiplication with −1 depending on the used convention. In other words, the output of the 1×1 convolution layer before the sigmoid may give the corresponding bit LLRs.

In some example embodiments, the ML model 301 may be configured to output bit LLRs in the output array 306. In some example embodiments, the ML model 301 may be configured to output bit probabilities in the output array 306. In some example embodiments, the ML model 301 may be configured to output bit values in the output array 306.

Any operations performed by the ML model 301 can be in complex or real domain. This may depend on, for example, the hardware the ML model 301 is implemented on. The disclosure herein may assume complex operations as the data array 301 may be a Fourier transformed signal. For an implementation using real operations, the real and imaginary parts of a complex number can be fed to channels of the ML model 301. In such a case, the number of channels in the data 305 may be doubled compared to the complex case.

The ML model 301, may process a whole TTI/code block as a single pass through the ML model 301. Thus, the ML model 301 can implicitly learn channel estimation and interpolation over the whole TTI. Moreover, processing the whole code block may be beneficial for the final decoding stage, since this may result in more accurate signal-to-noise ratio (SNR) estimation.

Figure 5:
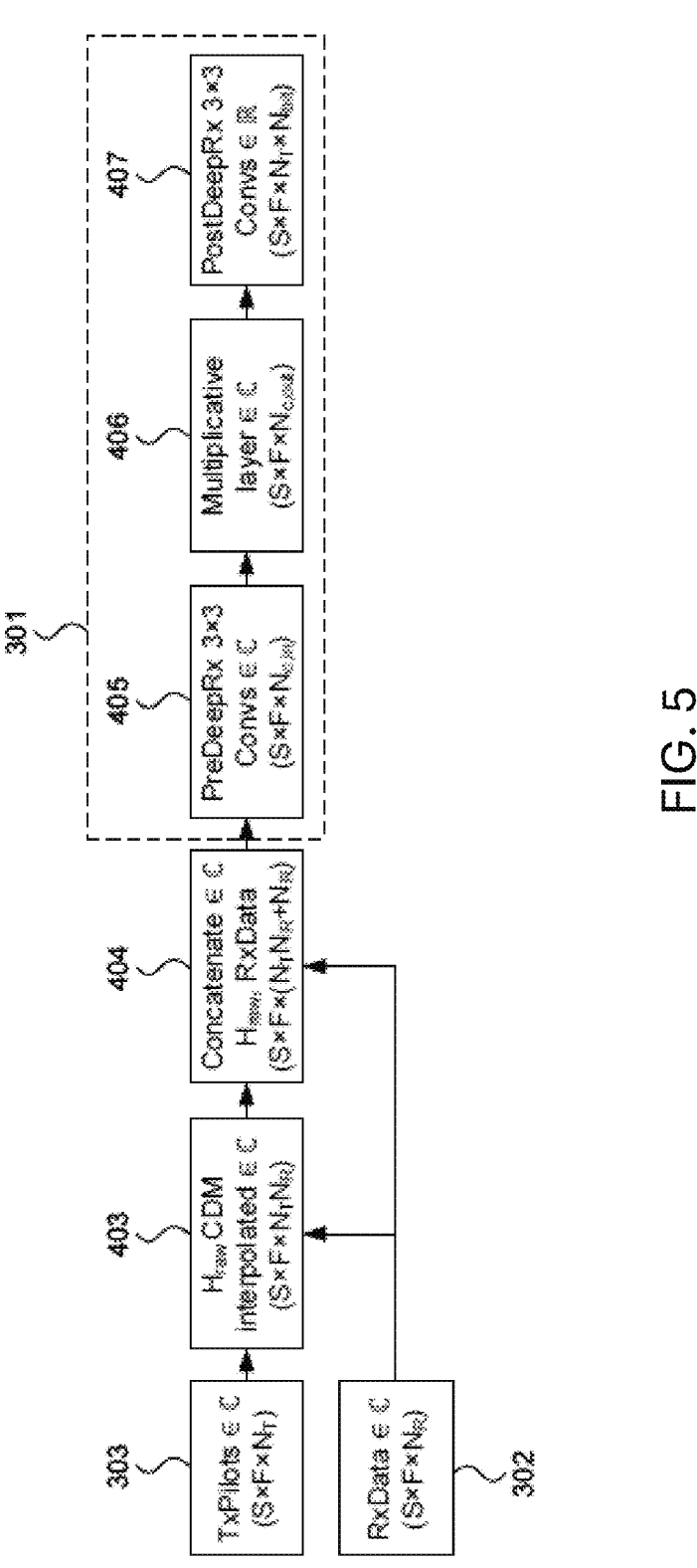
FIG. 5 illustrates an example embodiment of the subject matter described herein illustrating block diagram of a machine learning model comprising at least one multiplicative layer.

FIG. 5 illustrates an example embodiment of the subject matter described herein illustrating block diagram of a ML model 301 comprising at least one multiplicative layer. It is possible also to use a plurality of multiplicative layers in parallel or in sequence, with potentially other learned layers in between.

In the embodiment of FIG. 5, S is number of symbols, F is the number of subcarriers, $N_T$ is the number of MIMO layers, $N_R$ is the number of receiver antennas, and $N_{bit}$ is the maximum number of output bits (e.g. 8 for QAM256). $N_{c,in/out}$ refers to the number of channels in NN input/ outputs.

The ML model 301 may receive reference signals in a reference signal array 303.

The ML model 301 may receive received data in a data array 302.

According to an example embodiment, the at least one memory and the computer program code are further configured to, with the at least one processor, cause the radio receiver to obtain a reference signal array 303 representing a reference signal configuration applied during the time interval and compute a channel estimate based on the data array and the reference signal array, and wherein the data 305 further comprises channel estimate.

The received data and the corresponding reference signals can be used to form a raw channel estimate $H_{raw}$ in functional block 403. For example, $H_{raw}=RxData×conj(TxPilots)$. The layer-wise channel estimates may be partially overlapping due to code division multiplexing (CDM), and hence the overlapping reference signals should be further processed to obtain the actual pilot channel estimate from the raw estimate. To this end, the consecutive raw estimates in frequency domain can be averaged.

Having obtained the raw channel estimate, the interpolation that follows can be based on the simple nearest neighbour rule, where the raw estimate from the nearest pilot symbol is utilized as the estimate for each data symbol. Even though this is a crude form of interpolation, it was observed to be sufficient for obtaining high detection accuracy.

In functional block 404, the raw channel estimate and the data array 302 can be concatenated in the channel/depth dimension to form the data 305 to be fed into the ML model 301.

According to an example embodiment, the ML model 301 comprises a neural network component 405 before the transformation and a neural network component 407 after the transformation. "Before" and "after" may refer to the processing order. Thus, the output of the NN component before the transformation may function as the input for the transformation and the output of the transformation may function as the input for the NN component after the transformation.

In the example embodiment of FIG. 5, the transformation comprises at least one multiplicative layer 406. The neural network component 405 before the transformation may be referred to as PreDeepRx and the neural network component 407 after the transformation may be referred to as Post-DeepRx.

According to an example embodiment, the neural network component 405 before the transformation is configured to perform processing between elements in the data array 305 corresponding to different subcarriers and/or to different timeslots.

According to an example embodiment, the neural network component 405 before the transformation and/or the neural network model 407 after the transformation comprises a convolutional neural network. For example, in the example embodiment of FIG. 5, the PreDeepRx 405 comprises a plurality of convolutional layers and the PostDeepRx 407 comprises a plurality of convolutional layers.

The at least one multiplicative layer 406 can perform as trained pre-processing, where the pre-processing stage can be trained in conjunction with the other components of the ML model 301, such as the PreDeepRx 405 and the Post-DeepRx 407.

In some example embodiments, the at least one multiplicative layer 406 may be comprised in a trained NN. For example, the PreDeepRx 405, the at least one multiplicative layer 406, and the PostDeepRx 407 may form a single NN. Thus, in some example embodiments, the ML model 301 may be implemented as a single NN.

In some example embodiments, the ML model 301 may comprise a plurality of multiplicative layers processed sequentially or in parallel. Also there may be learned layers between these multiplicative layers.

It may be surprising that the multiplicative layer 406 can significantly help the processing. This may be at least partially due to the fact that otherwise the ML model 301 may need to approximate complex-valued multiplication operations between the inputs using only summations. This new type of a fully learned ML model 301 may achieve higher detection accuracy. In fact, at least in some situations, it may nearly match the performance of a genie-aided system.

Figure 6:
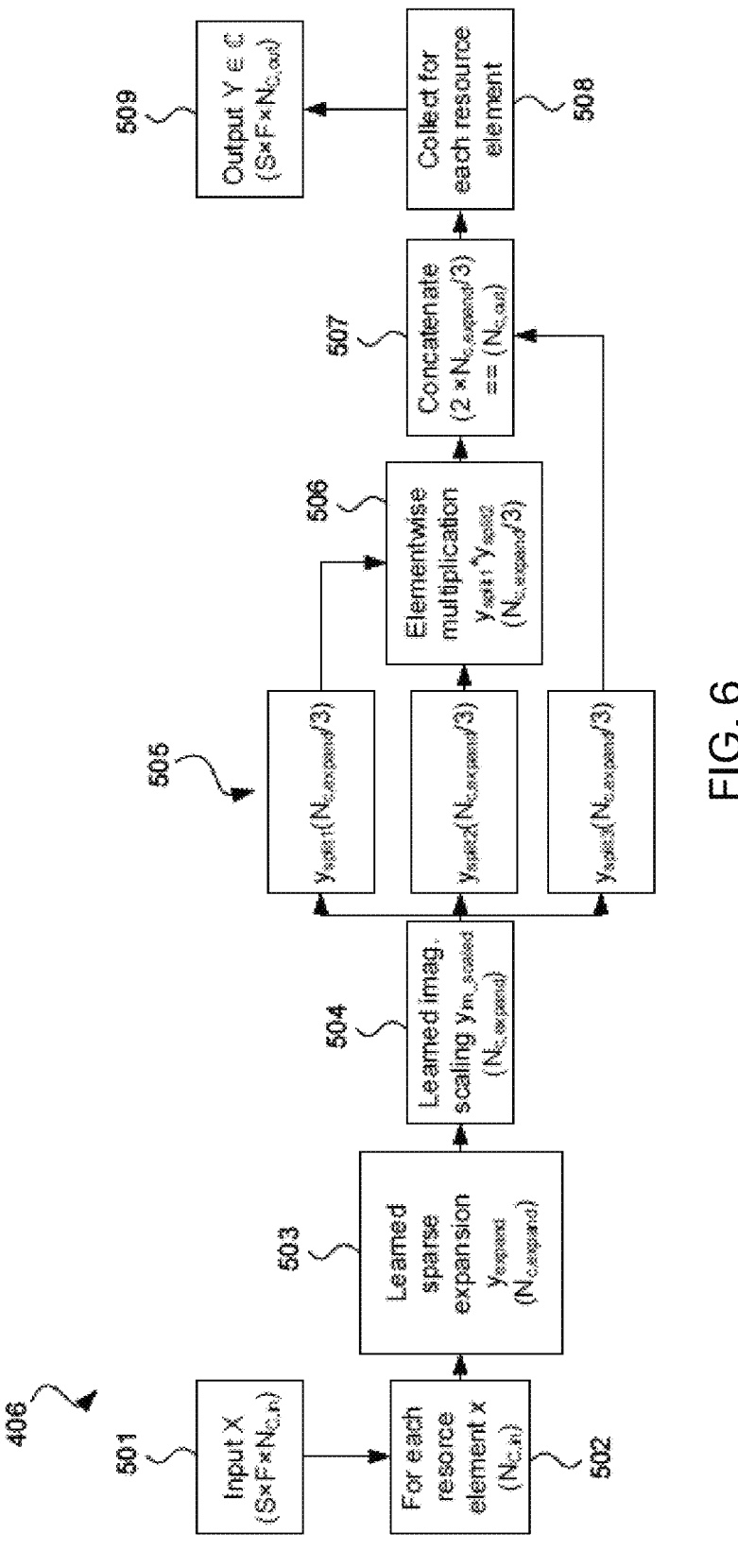
FIG. 6 illustrates an example embodiment of the subject matter described herein illustrating block diagram of a multiplicative layer.

FIG. 6 illustrates an example embodiment of the subject matter described herein illustrating block diagram of a multiplicative layer 406.

According to an example embodiment, the multiplicative layer 406 is configured to multiply together elements in the data array 305.

According to another example embodiment, the multiplicative layer 406 is configured to multiply together elements in the data array 305 corresponding to different MIMO layers.

According to another example embodiment, the multiplicative layer 406 is further configured to complex conjugate at least one of the elements to be multiplied before the multiplication.

In the example embodiment of FIG. 6, the multiplicative layer 406 performs the same learned operations for every symbol but performing operations processing between different symbols/resource elements, thus "mixing" different symbols/resource elements, before this transformation may be beneficial. Such mixing may be implemented, for example, as a complex residual network (resnet) with 3×3 filters in the PreDeepRx 405.

It is also possible to train different kinds of networks that achieve good performance. However, a multiplicative layer and complex conjugation, as indicated in the example embodiment of FIG. 6, may be beneficial. Such alternative implementations are disclosed herein.

The output of the PreDeepRx 405 can represent the input 501 of the multiplicative layer 406. This phase can be expressed as $X=NN_{resnet}((Y,H))\in\mathbb{C}^{S\times F\times N_{c,in}}$, where (,) represents the concatenation operation, $NN_{resnet}$ is a deep complex-valued ResNet with 3×3 filters in frequency (i) and time (j) dimensions. $Y\in\mathbb{C}^{S\times F\times N_R}$ is the received signal for the full TTI $\hat{H}\in\mathbb{C}^{S\times F\times N_R\times N_T}$ is the nearest neighbor interpolated raw channel estimate.

The ResNet output X is then fed to the multiplicative layer 406. The multiplicative layer operates on single resource element (jth subcarrier in ith OFDM symbol) at a time, as illustrated by the functional block 502, and shares weights for all resource elements. Thus, in this example embodiment, the multiplicative layer 406 may repeat the same operation for each resource element.

In functional block 502, a resource element is chosen $x=X_{i,j}$: where $x\in\mathbb{C}^{N_{c,in}\times 1}$ (a complex vector of $N_{c,in}$ components consisting of the ijth-resource element from all input channels).

The trainable weight matrices (weights shared for all symbols) of the multiplicative layer 406 are $W_{expand}\in\mathbb{C}^{N_{c1}\times N_{c,in}}$ and $W_{im}\in\mathbb{R}^{N_{c,in}\times 1}$.

The processing of the multiplicative layer 406 can be defined with the following stages.

According to an example embodiment, the multiplicative layer 406 is configured to perform a sparse expansion on the data array. In the sparse expansion, most elements in the weight matrix $W_{expand}$ are zero or at least near zero.

In functional block 503, a sparse expansion is performed on the resource element x: $y_{expand}=W_{expand}x$. This can expand channels of the resource element sparsely. To enforce sparsity, L1 regularisation can be used when training $W_{expand}$. No bias term may be needed.

According to an example embodiment, the multiplicative layer 406 is configured to scale an imaginary part and/or a real part separately from each other of at least one element in the data array 305.

In functional block 504, a learned scaling for the imaginary part of $y_{expand}$ can be performed: $y_{im\_scaled}=$ real $(y_{expand})+w_{im}*$imag$(y_{expand})$.

The $y_{im\_scaled}$ scaled is then split into three parallel functional blocks 505 $(y_{split1}, y_{split2}, y_{split3})=$split$(y_{im\_scaled}, 3)$, where split operation splits the $y_{im\_scaled}$ scaled into three equal size parts.

In functional block 506, two of the three split parts are multiplied together, and the result is concatenated with the third split part in functional block 507. Thus, the result can be expressed as $y_{out}=(y_{split1}*y_{split2}, y_{split3})\in\mathbb{C}^{N_{c,out}}$. This functions as the output for one resource element.

In functional block 508, the results for each resource element can be collected together and this is the output 509 of the multiplicative layer 406.

Above, * denotes elementwise multiplication, and $y_{out}$ 509 is the output of the multiplicative layer 406. The output 509 can then be fed to the PostDeepRx 407 for bit detection.

Scaling 504 of the imaginary part with a real number can allow, for each input channel, the ML model 301 to select if the channel needs to be complex conjugated (−1=conjugate, +1=no conjugate) or even represent a more general operation. L1 regularization of $W_{expand}$ can ensure that ML model 301 can learn to select carefully the elements that should be multiplied. The actual multiplication can be carried out by multiplying $y_{split1}$ and $y_{split2}$, while $y_{split3}$ spun represents a skip connection.

According to another example embodiment, $y_{expand}$ may be split into four parts: $(y_{split1}, y_{split2}, y_{split3}, y_{split4})=$split $(y_{expand}, 4)$. $y_{split4}$ is for a skip connection. Then, $y_{out}=$concat $(y_{split1}*$conj$(y_{split2}*$conj$(y_{split2}),y_{split3}*y_{split3}, y_{split4})$ where * denotes elementwise multiplication, and conj( ) denotes elementwise complex conjugation. Other operations may be performed as disclosed above.

According to another example embodiment, the input x may be concatenated with the complex conjugate of itself forming vector $x_{conj}$: $x_{conj}=$concat$(x,$conj$(x))$. The vector $y_{expand}$ can then be formed using $x_{conj}$: $y_{expand}=W_{expand}x_{conj}$. Other operations may be performed as disclosed above.

Figure 7:
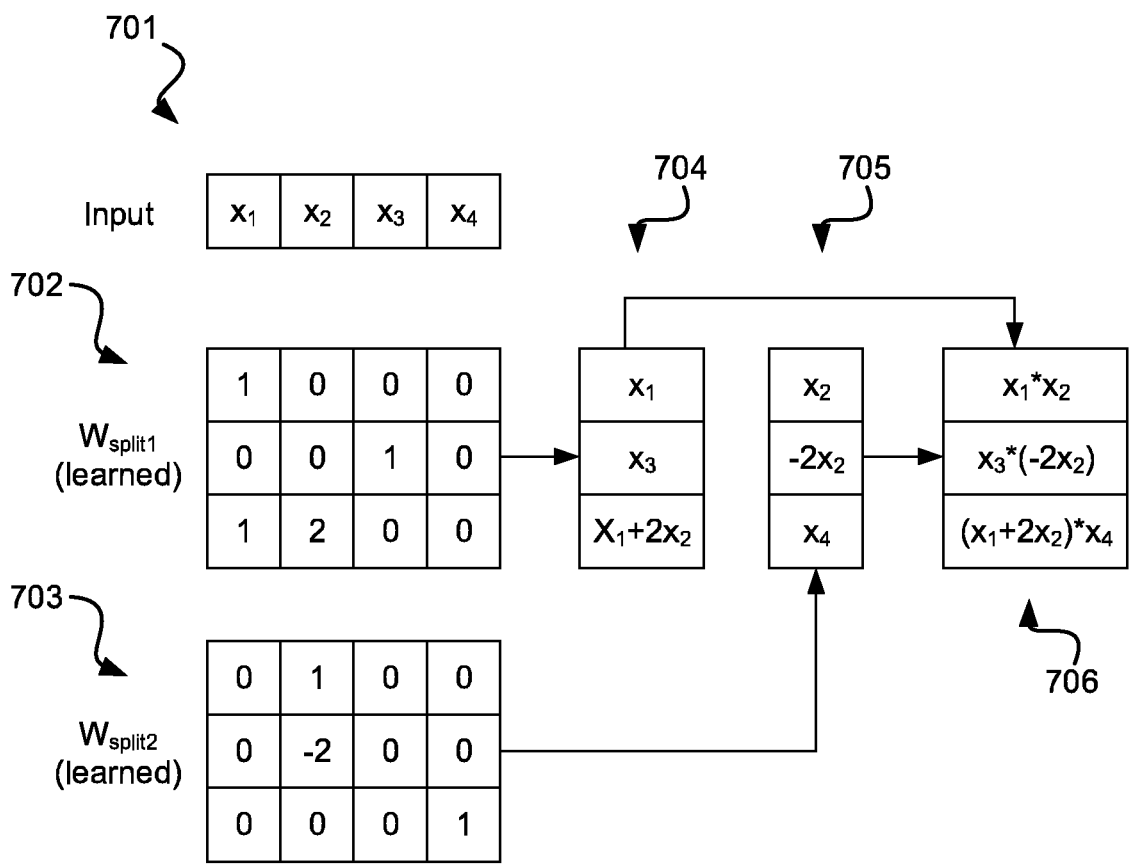
FIG. 7 illustrates an example embodiment of the subject matter described herein illustrating selected operations of the multiplicative layer.

FIG. 7 illustrates an example embodiment of the subject matter described herein illustrating selected operations of the multiplicative layer 406.

The example embodiment of FIG. 7 visualises the operations that can be performed by the sparse expansion 503, split 505 and multiplication 506 blocks. Scaling of the imaginary part 504 is not shown for clarity. It should be appreciated that this example may be too simplistic for practical applications.

The input 701 corresponds to a single resource element and the elements of the input 701 correspond to different layers. Matrix $W_{split1}$ 702 performs the sparse expansion and splitting of the input 701 into the first split part 704 and Matrix $W_{split2}$ 703 performs the sparse expansion and splitting of the input 701 into the second split part 705. The result 706 can be obtained by elementwise multiplication of the first split part 704 and the second split part 705. The third split part is not illustrated in the example embodiment of FIG. 7.

Figure 8:
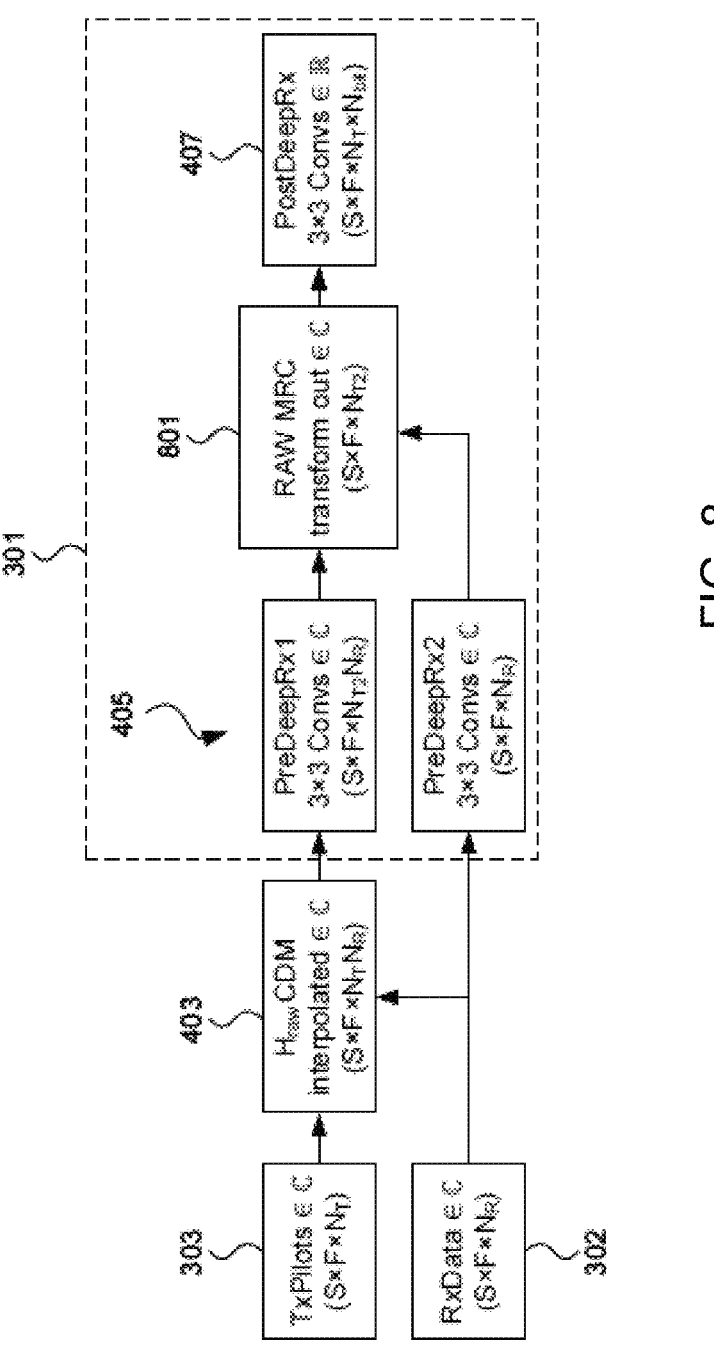
FIG. 8 illustrates an example embodiment of the subject matter described herein illustrating block diagram of a machine learning model comprising maximal-ratio combining.

FIG. 8 illustrates an example embodiment of the subject matter described herein illustrating block diagram of a machine learning model comprising maximal-ratio combining.

The example embodiment of FIG. 8 may be similar to the example embodiment of FIG. 5. However, in the example embodiment of FIG. 8, the transformation comprises a type of equalisation, maximal-ratio combining (MRC) 801 instead of a multiplicative layer 406. Further, in the example embodiment of FIG. 8, the PreDeepRx 405 is implemented as two parallel neural networks referred to as PreDeepRx1 and PreDeepRx2. In some example embodiments, the Pre-DeepRx 405 may be optional. Moreover, the raw channel estimate and the received data are not concatenated before feeding them into the PreDeepRx 405 in the embodiment of FIG. 8. Instead, the raw channel estimate can be fed into PreDeepRx1 and the received data array 302 can be fed into PreDeepRx2.

In MRC, the signals from each channel may be added together. The gain of each channel can be made proportional to the root mean square signal level in that channel. Different proportionality constants can be used for each channel.

The transformation may be simpler to implement using MRC. A benefit of this approach may be that the transformation may require little to no learning, since it can be largely based on a deterministic rule. This can slightly reduce the overall receiver performance, but it can still be considered a useful trade-off between complexity and accuracy.

To describe MRC 801 in more detail for a MIMO system with $N_T$ MIMO layers and N R real or virtual RX antenna streams, let us denote the interpolated channel estimate by $\hat{H}_{ij} \in \mathbb{C}^{N_R \times N_T}$ for subcarrier i at OFDM symbol j (a crude nearest neighbor interpolated channel estimate suffices). The MRC transformation matrix can then be obtained as $$G_{ij} = S_{ij}\hat{H}_{ij}^{H},$$

where $$S_{ij} = \begin{bmatrix} 1/\|\hat{h}_{ij,1}\|^2 & \cdots & 0 \\ \vdots & \ddots & \vdots \\ 0 & \cdots & 1/\|\hat{h}_{ij,N_T}\|^2 \end{bmatrix}$$

is a $N_T \times N_T$ diagonal matrix for scaling the channel gains, and $\hat{h}_{ij,k}$ denotes the kth column of $\hat{H}_{ij}$. The transformed output can be obtained via a vector-matrix multiplication as $y_{ij,MRC} = G_{ij}y_{ij}$ where $y_{ij} \in \mathbb{C}^{N_R \times 1}$ is the received signal. The output of the MRC 801 ($y_{ij,MRC}$) can be fed into the PostDeepRx 407.

The MRC 801 can be preceded by an optional learned part (PreDeepRx) 405. The PreDeepRx 405 can create so-called virtual RX antenna streams that can help the rest of the ML model 301 to overcome the MRC bottleneck issue and/or process the received data 302 before the MRC 801. This is illustrated in the example embodiment of FIG. 8 as two parallel NN components 405 before the MRC 801: Pre-DeepRx1 and PreDeepRx2. The former can process the raw channel estimate, while the latter can process the received data 302. The approach can also include a plurality (1 . . . N) of virtual RX antennas and virtual TX layers that can allow also, for example, CDM processing to work properly.

The term "virtual RX antenna streams" may describe the output of the PreDeepRx 405. The output can be seen as sort of virtual antenna stream as it may have the same dimensions as the actual RX antenna streams but may be augmented/modified by the PreDeepRx 405 to compensate bottlenecks in MRC.

The virtual data can be obtained by specifying a larger output from the PreDeepRx 405. The number of (virtual) Rx antennas should be equal between both inputs of the MRC 801. The output of the MRC 801 for the whole data can be concatenated and fed into PostDeepRx 407.

In some example embodiments, the input (RxData or $y_{ij}$) or parts of it can also be fed directly to DeepRx network. However, this may not provide any performance gain.

Figure 9:
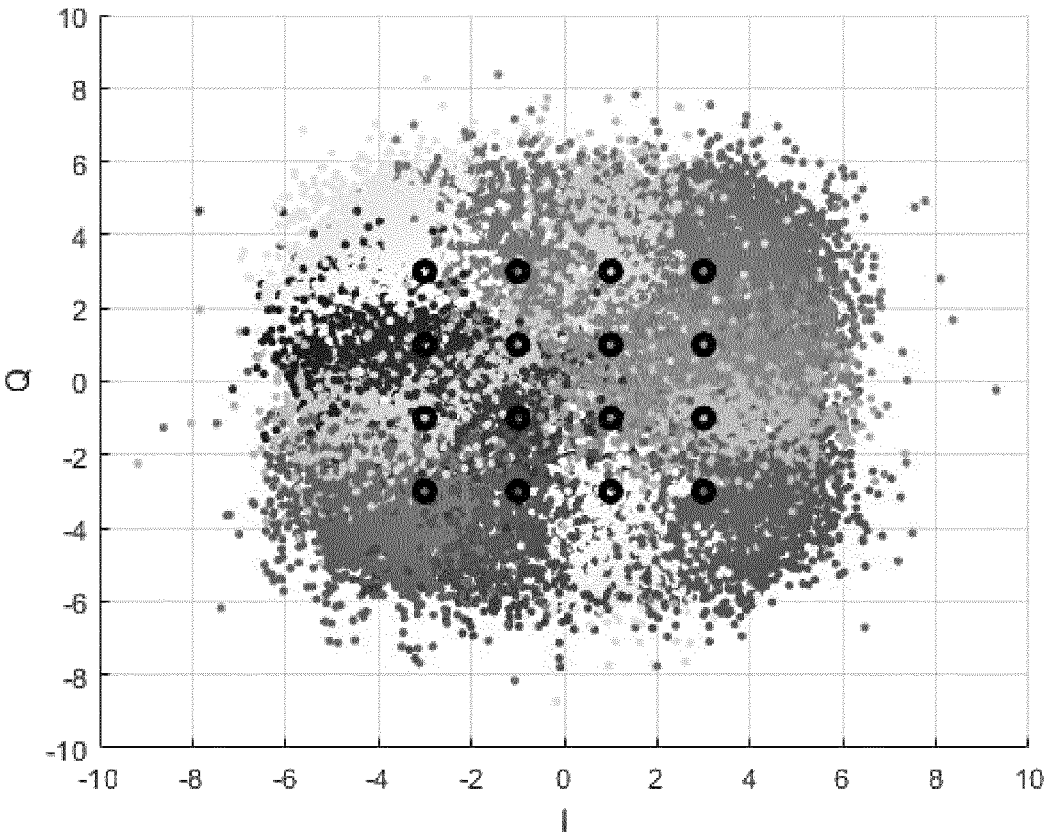
FIG. 9 illustrates a comparative example of the subject matter described herein illustrating maximal-ratio combining.

FIG. 9 illustrates a comparative example of the subject matter described herein illustrating maximal-ratio combining.

One can consider the MRC 801 as a type of partial equalization. This may invoke an invalid assumption that all the spatial streams experience fully orthogonal channel realizations. This means that the cross terms between the channels of different RX antennas are exactly zero, which in reality only holds when the number of RX antennas tends to infinity and the channels are statistically independent. This assumption is not true for any reasonable number of antennas, and hence the resulting symbols can be very inaccurate if used as is. This is illustrated in FIG. 9, which visualises the symbols after MRC transformation. Even though FIG. 9 represents an example scenario without noise and with independent and identically distributed channel coefficients, the MRC transformation is still incapable of equalizing the RX signal. However, in the radio receiver 100, such MRC transformation is shown to facilitate efficient bit detection when followed by a properly trained neural network that carries out rest of the equalization and detection.

Figure 10:
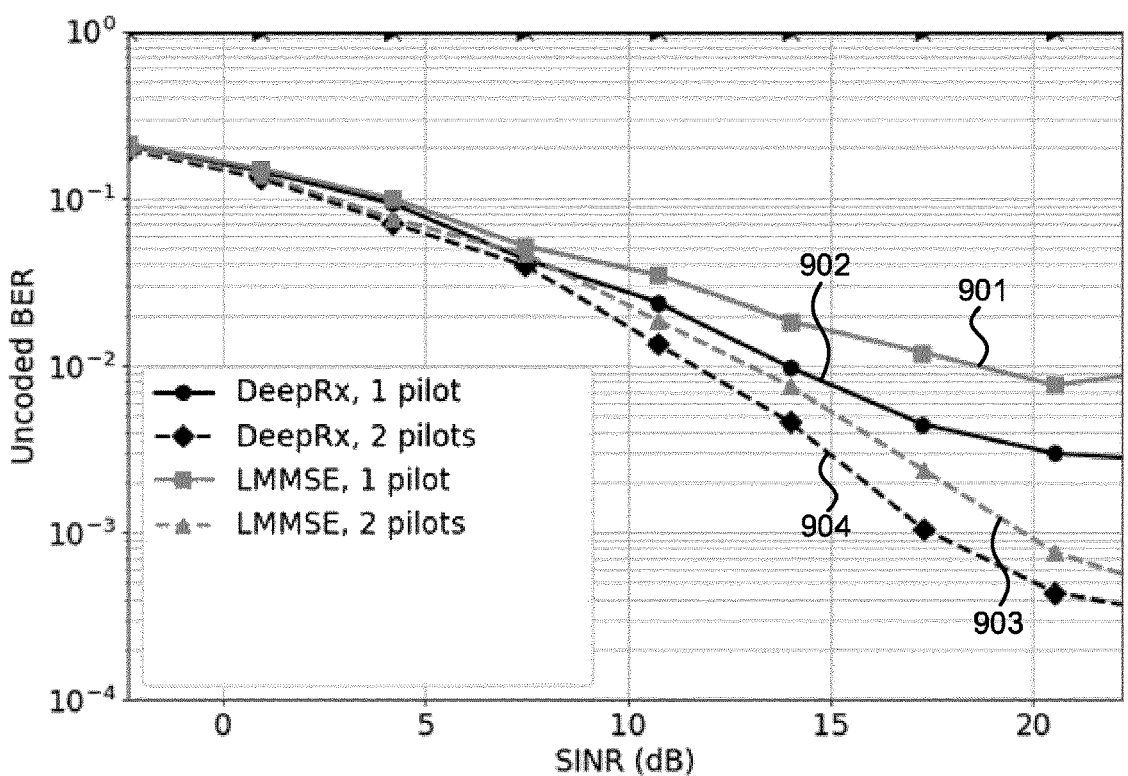
FIG. 10 illustrates a comparative example of the subject matter described herein illustrating simulation results.

FIG. 10 illustrates a comparative example of the subject matter described herein illustrating simulation results.

In the comparative example of FIG. 10, curve 901 corresponds to a ML-based receiver without the transformation with one pilot signal, curve 902 corresponds to a ML-based receiver without the transformation with two pilot signals, curve 903 corresponds to a linear-minimum-mean-square-error (LMMSE) receiver with one pilot signal, curve 904 corresponds to a LMMSE receiver with two pilot signals.

All of the simulation results herein have been obtained using a link-level simulation tool and a 16×4 MIMO model.

Figure 11:
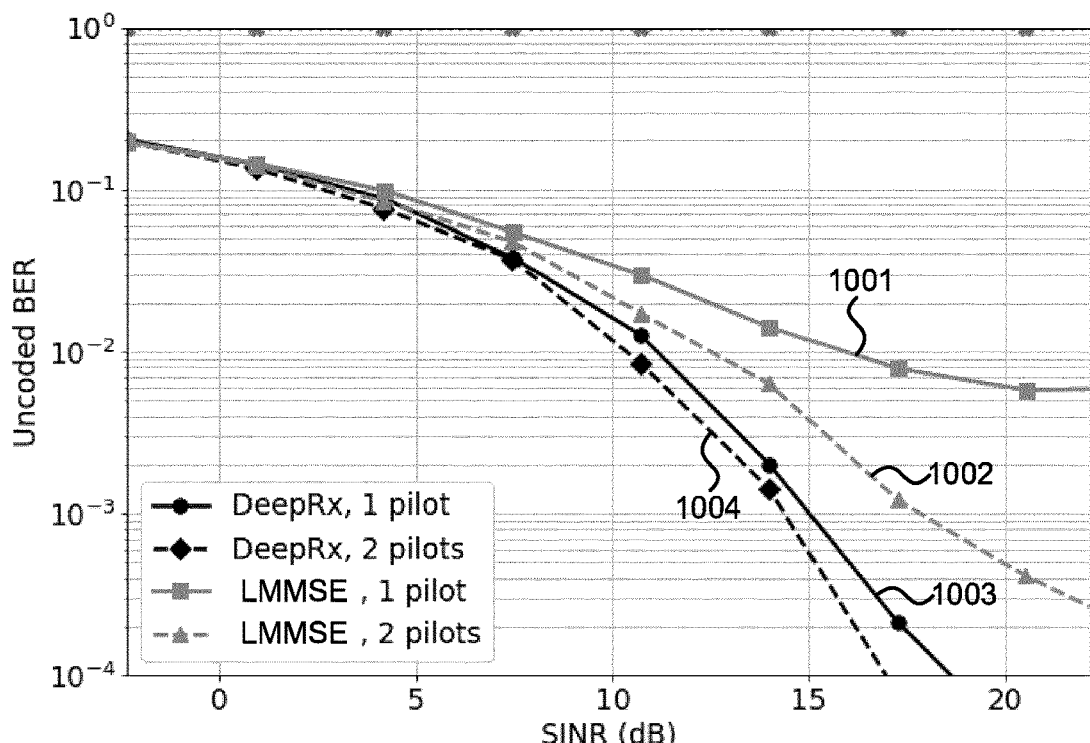
FIG. 11 illustrates an example embodiment of the subject matter described herein illustrating simulation results.

FIG. 11 illustrates an example embodiment of the subject matter described herein illustrating simulation results.

In the example embodiment of FIG. 11, curve 1001 corresponds to a reference receiver with one pilot signal, curve 1002 corresponds to a reference receiver with two pilot signals, curve 1003 corresponds to the radio receiver 100 with the multiplicative layer 406 with one pilot signal, and curve 1004 corresponds to the radio receiver 100 with the multiplicative layer 406 with two pilot signals.

Figure 12:
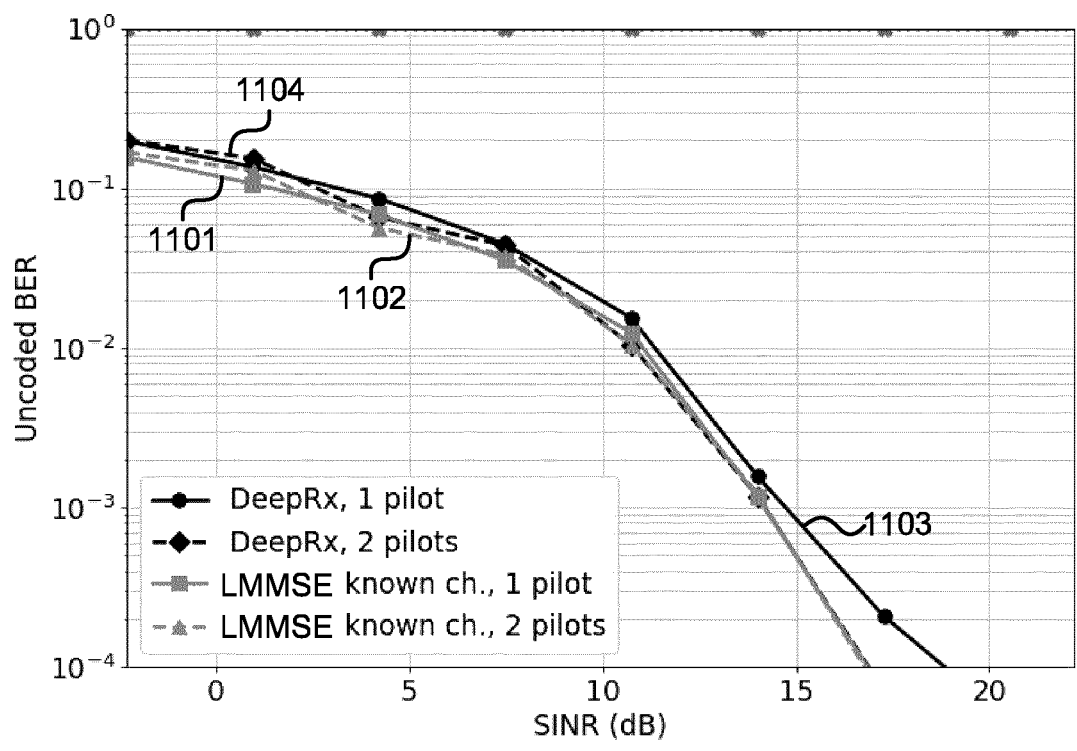
FIG. 12 illustrates another example embodiment of the subject matter described herein illustrating simulation results.

FIG. 12 illustrates another example embodiment of the subject matter described herein illustrating simulation results.

In the example embodiment of FIG. 12, curve 1101 corresponds to a genie-aided receiver with unrealistic perfect channel knowledge with one pilot signal, curve 1102 corresponds to a genie-aided receiver with unrealistic perfect channel knowledge with two pilot signals, curve 1103 corresponds to the radio receiver 100 with the multiplicative layer 406 with one pilot signal, and curve 1104 corresponds to the radio receiver 100 with the multiplicative layer 406 with two pilot signals.

Figure 13:
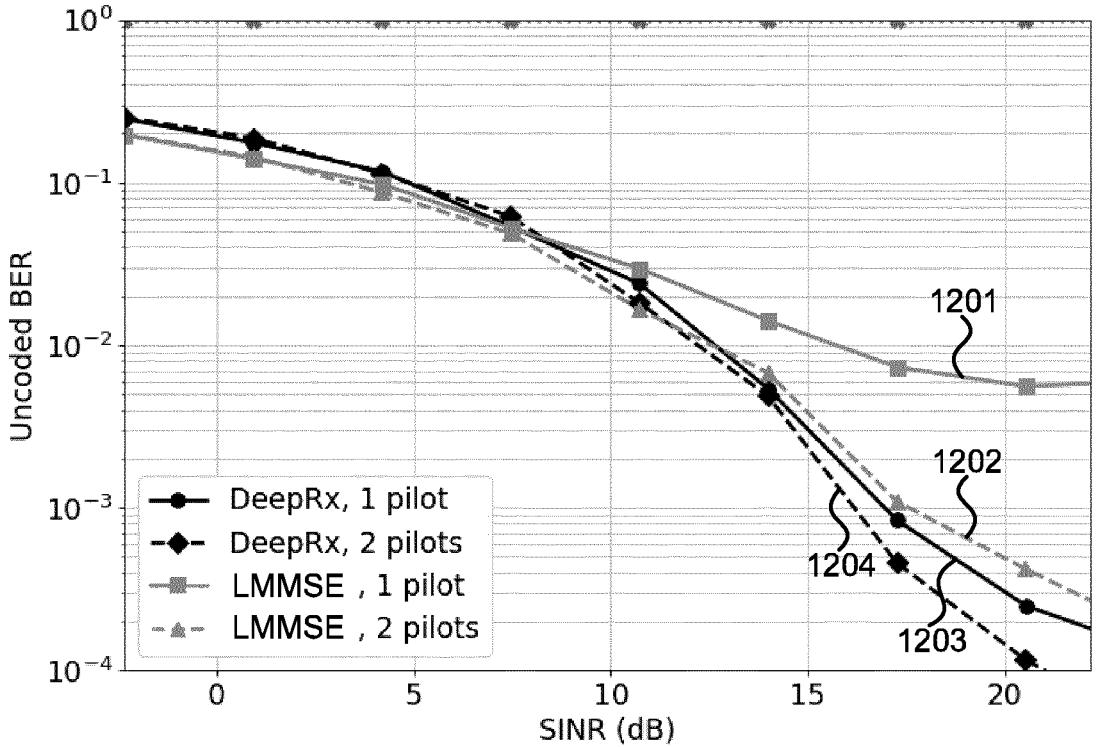
FIG. 13 illustrates another example embodiment of the subject matter described herein illustrating simulation results.

FIG. 13 illustrates another example embodiment of the subject matter described herein illustrating simulation results.

In the example embodiment of FIG. 13, curve 1201 corresponds to a reference receiver with one pilot signal, curve 1202 corresponds to a reference receiver with two pilot signals, curve 1203 corresponds to the radio receiver 100 with the MRC 801 with one pilot signal, and curve 1204 corresponds to the radio receiver 100 with the MRC 801 with two pilot signals. In this embodiment, real RX antennas and pilots were used, i.e. PreDeepRx 405 was not used. This method may allow for an easier and more efficient implementation in hardware.

Figure 14:
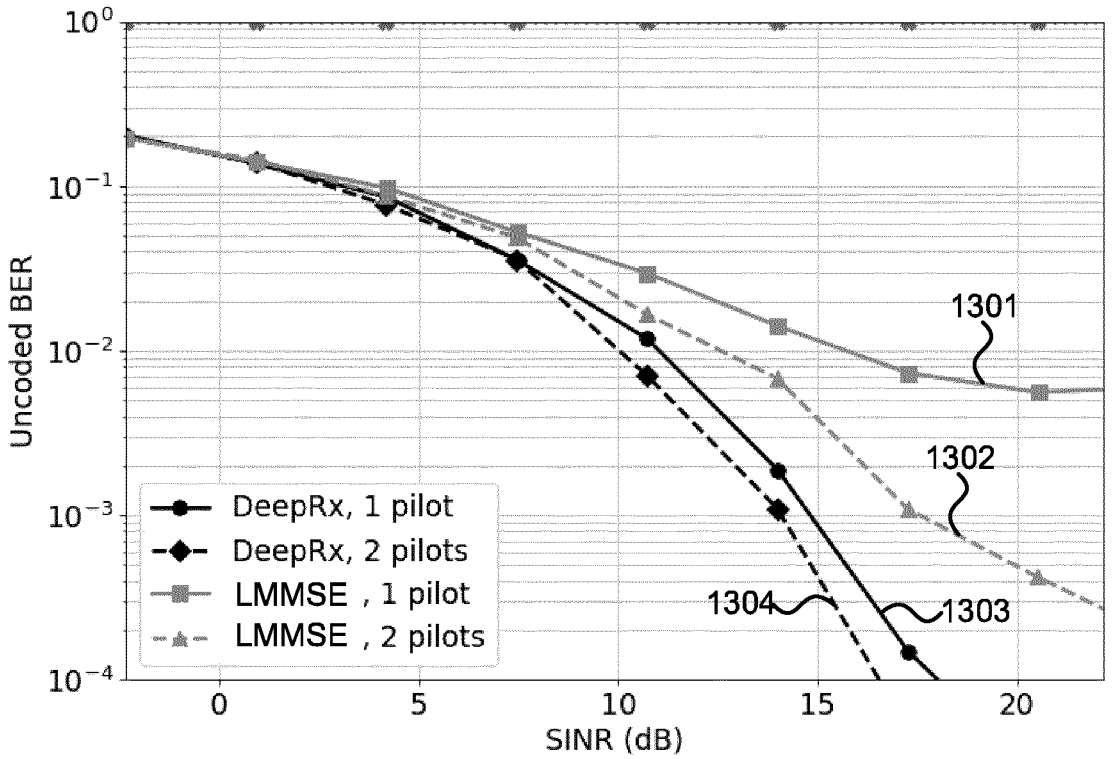
FIG. 14 illustrates another example embodiment of the subject matter described herein illustrating simulation results.

FIG. 14 illustrates another example embodiment of the subject matter described herein illustrating simulation results.

In the example embodiment of FIG. 14, curve 1301 corresponds to a reference receiver with one pilot signal, curve 1302 corresponds to a reference receiver with two pilot signals, curve 1303 corresponds to the radio receiver 100 with the MRC 801 with one pilot signal, and curve 1304 corresponds to the radio receiver 100 with the MRC 801 with two pilot signals. In this embodiment, virtual RX antennas and pilots were used, i.e. PreDeepRx 405 was used. 16 virtual antennas and 16 virtual layers were used.

Figure 15:
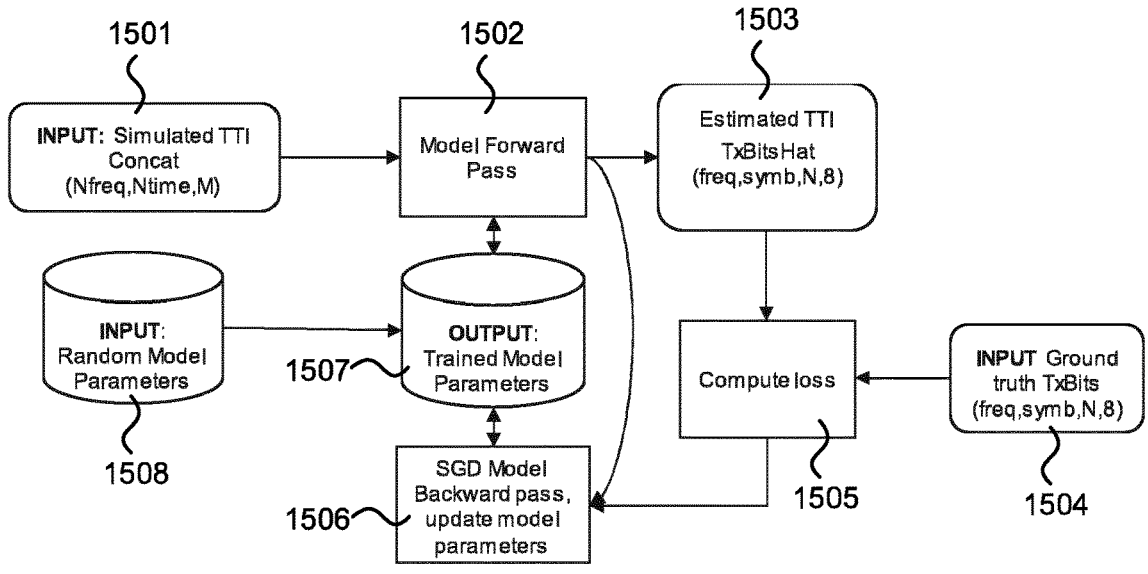
FIG. 15 illustrates another example embodiment of the subject matter described herein illustrating data flow in machine learning model training.

FIG. 15 illustrates another example embodiment of the subject matter described herein illustrating data flow in neural network training.

According to an embodiment, a method for training a neural network for the radio receiver comprises obtaining a training input dataset and a ground truth corresponding to the training input dataset.

The training input dataset may be part of a plurality of training data records. Each such training data record may be used for training the neural network.

The method may further comprise inputting a training input dataset into the neural network. The training input dataset may comprise a training data array comprising a plurality of elements, wherein each element in the plurality of elements in the training data array corresponds to a subcarrier in a plurality of subcarriers, to a timeslot in a time interval, and to a layer of a multiple-input and multiple-output, MIMO, transmission.

The input training dataset may comprise, for example, simulated data 1501. The simulated data 1501 may be generated using, for example, link-level simulator. The simulated data 1501 may be generated by simulating transmitter-receiver chain and storing sent encoded bits (for ground truth), received signal and other relevant information such as reference signal configurations and parameters.

At the start of the training, the ML model 301 may be configured with random parameters 1508.

The simulated data 1501 may be fed into the ML model 301. This may be referred to as model forward pass 1502.

The method may further comprise receiving an estimated output of the training input dataset from the ML model 301 representing bit values of the plurality of elements in the training data array.

The estimated output may comprise the estimated bit values 1503 for the input training dataset.

The method may further comprise computing a cost function based on the estimated output 1503 and the ground truth 1504.

The cost function may be computed by, for example, comparing the estimated bit values 1503 to the ground truth bit values 1504. The ground truth bit values 1504 may be obtained from a training dataset. The cost function 1505 may comprise, for example, the cross-entropy loss between the ground truth bits 1504 and estimated bits 1503.

The method may further comprise adjusting at least one parameter of the ML model 301 according to the computed cost function. The at least one parameter of the ML model 301 may comprise, for example, at least one weight of the ML model 301, such as a weight of a NN.

The adjustment of the at least one parameter may be referred to as backward pass 1506. The parameters may be adjusted using, for example, stochastic gradient decent (SGD) or its extensions (e.g. Adam optimizer) and back-propagation. This may output trained parameters 1507.

The above description of the training process may correspond only to part of the training process. The parameters of the ML model 301 may be adjusted in an iterative fashion, whereby the forward pass 1502 is performed after each adjustment. Based on how the previous parameter adjustment changes the value of the loss function 1505, further adjustments can be deduced using, for example, SGD. Such iteration of the parameters can be continued until, for example, the loss function reaches a preconfigured threshold or until some other condition for the performance of the ML model 301 is reached.

The training may be performed by any computing device, such as a computer. For example, the training can be performed in the cloud with simulated or real data collected from the BS. No ground truth channel information may be needed for training, only the received RX signals and ground truth bits may be required.

Any disclosure herein in relation to the data 305 may apply also to the training input dataset.

The training input dataset may further comprise a reference signal array. The reference signal array may comprise a plurality of reference signals, wherein a location in the reference signal array of each reference signal in the plurality of reference signals indicates a subcarrier of the reference signal and a timeslot of the reference signal. The reference signal array may further comprise a preconfigured indicator value in each location of the reference signal array not comprising a reference signal. The reference signal array may comprise a plurality of channels, wherein each channel in the plurality of channels in the reference signal array corresponds to a layer of a MIMO transmission.

The training input dataset may further comprise a frequency array representing subcarrier frequencies of the plurality of subcarriers.

The training input dataset may comprise a plurality of channels. At least one channel in the plurality of channels of the dataset corresponds to the reference signal array. At least one channel in the plurality of channels of the training input dataset may correspond to the frequency array. The data array may comprise a plurality of channels and data from a plurality of antenna streams. Each channel in the data array may correspond to an antenna stream in the plurality of antenna streams.

Figure 16:
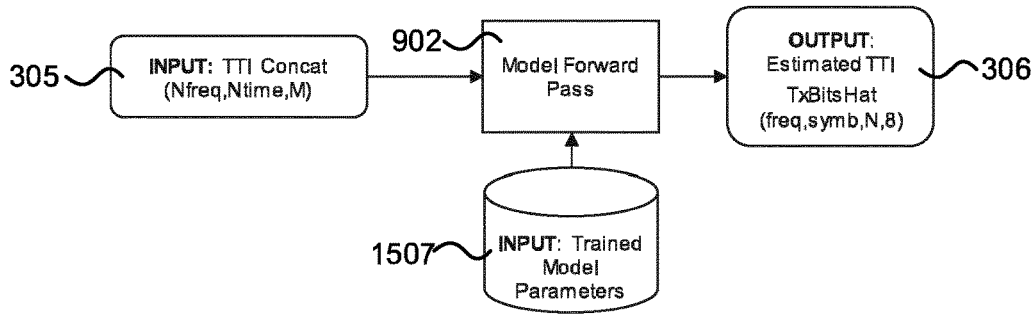
FIG. 16 illustrates another example embodiment of the subject matter described herein illustrating data flow in machine learning model usage.

FIG. 16 illustrates another example embodiment of the subject matter described herein illustrating data flow when using a trained ML model.

The output of the training procedure may be the trained model parameters 1507. These may also be referred to as a simulation-trained model. This model can be used in production as shown in the example embodiment of FIG. 16.

For example, the radio receiver 100 may use the ML model 301 by inputting the data 305 into the ML model 301 in a forward pass 1502 manner. Using the trained model parameters 1507 and the data 305, the ML model 301 can output the output dataset comprising the estimated bit values 306.

Figure 17:
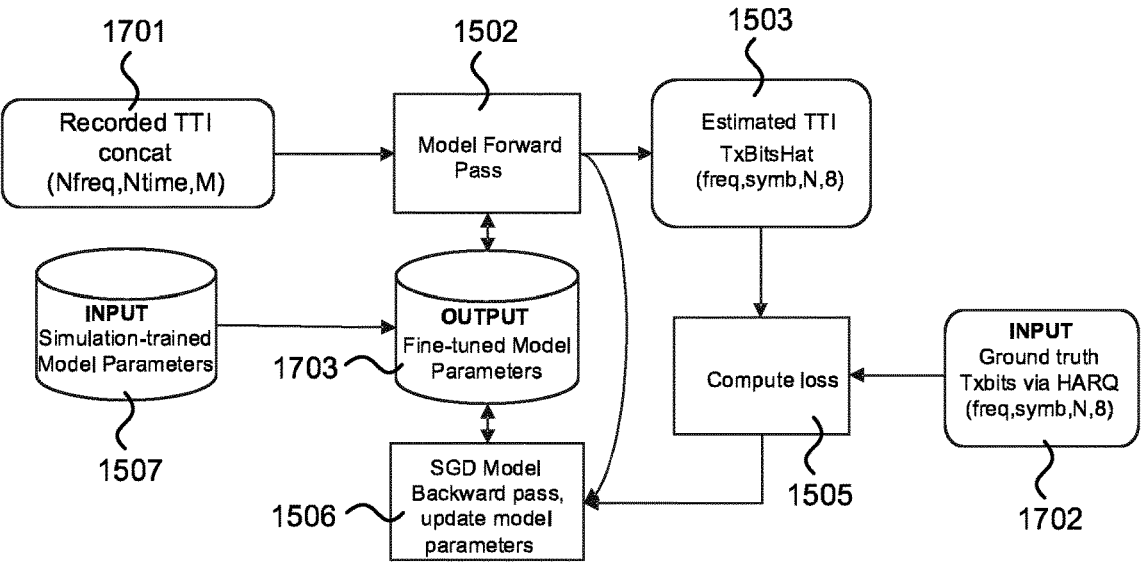
FIG. 17 illustrates another example embodiment of the subject matter described herein illustrating data flow in machine learning model fine tuning.

FIG. 17 illustrates another example embodiment of the subject matter described herein illustrating data flow in fine-tuning a trained ML model.

The trained model parameters 1507 may be finetuned for specific location or situation after the training has been performed. The fine-tuning may be performed using, for example, data collected from the field. For the fine-tuning, the ground truth 1702 can be obtained via, for example, hybrid automatic repeat request (HARQ) resubmissions. This may allow obtaining training data also for cases where the decoding initially fails.

Fine-tuning of the parameters of the ML model 301 may be performed similarly to the training. The simulation-trained model parameters 1507 may function as the starting point for fine-tuning. In the finetuning, recorded data 1701 may be used in place of the simulated data 1501 used in training and the ground truth 1702 may be obtained via HARQ. The resulting parameters are fine-tuned parameters 1703.

An apparatus may comprise means for performing any aspect of the method(s) described herein. According to an example embodiment, the means comprises at least one processor, and memory comprising program code, the at least one processor, and program code configured to, when executed by the at least one processor, cause performance of any aspect of the method.

The functionality described herein can be performed, at least in part, by one or more computer program product components such as software components. According to an example embodiment, the radio receiver 100 comprises a processor configured by the program code when executed to execute the example embodiments of the operations and functionality described. Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), and Graphics Processing Units (CPUs).

Any range or device value given herein may be extended or altered without losing the effect sought. Also any example embodiment may be combined with another example embodiment unless explicitly disallowed.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

It will be understood that the benefits and advantages described above may relate to one example embodiment or may relate to several example embodiments. The example embodiments are not limited to those that solve any or all of the stated problems or those that have any or all of the stated benefits and advantages. It will further be understood that reference to 'an' item may refer to one or more of those items.

The steps of the methods described herein may be carried out in any suitable order, or simultaneously where appropriate. Additionally, individual blocks may be deleted from any of the methods without departing from the spirit and scope of the subject matter described herein. Aspects of any of the example embodiments described above may be combined with aspects of any of the other example embodiments described to form further example embodiments without losing the effect sought.

The term 'comprising' is used herein to mean including the method, blocks or elements identified, but that such blocks or elements do not comprise an exclusive list and a method or apparatus may contain additional blocks or elements.

It will be understood that the above description is given by way of example only and that various modifications may be made by those skilled in the art. The above specification, examples and data provide a complete description of the structure and use of exemplary embodiments. Although various example embodiments have been described above with a certain degree of particularity, or with reference to one or more individual example embodiments, those skilled in the art could make numerous alterations to the disclosed example embodiments without departing from the spirit or scope of this specification.

The invention claimed is:

1. A radio receiver, comprising:

at least one processor; and at least one memory storing instructions that, when executed with the at least one processor, cause the radio receiver to:

obtain a data array comprising a plurality of elements, wherein an element in the plurality of elements in the data array corresponds to a subcarrier in a plurality of subcarriers, to a timeslot in a time interval, and to an antenna stream;

implement a machine learning model comprising at least one neural network and a transformation, wherein the transformation comprises at least one multiplicative layer to multiply together elements in the data array, wherein the multiplicative layer is trained in conjunction with the at least one neural network of the machine learning model, and wherein output of the multiplicative layer functions as input for the at least one neural network; and input data into the machine learning model, wherein the data comprises at least the data array;

wherein the machine learning model is configured to, based on the input data, output an output array representing values of the plurality of elements in the data array, wherein the values comprise bits or symbols.

2. The radio receiver according to claim 1, wherein the machine learning model comprises a neural network component before the transformation and a neural network component after the transformation.

3. The radio receiver according to claim 2, wherein the instructions, when executed with the at least one processor, cause the radio receiver to perform processing between elements in the data array corresponding to at least one of different subcarriers or to different timeslots.

4. The radio receiver according to claim 1, wherein the machine learning model comprises equalisation that comprises maximal-ratio combining.

5. The radio receiver according to claim 1, wherein the instructions, when executed with the at least one processor, cause the multiplicative layer to complex conjugate at least one of the elements to be multiplied before the multiplication.

6. The radio receiver according to claim 1, wherein the instructions, when executed with the at least one processor, cause the multiplicative layer to scale at least one of an imaginary part or a real part separately from another of at least one element in the data array.

7. The radio receiver according to claim 1, wherein the instructions, when executed with the at least one processor, cause the multiplicative layer to perform a sparse expansion on the data array.

8. The radio receiver according to claim 1, wherein the at least one neural network comprises a convolutional neural network.

9. The radio receiver according to claim 1, wherein the instructions, when executed with the at least one processor, cause the radio receiver to:

obtain a reference signal array representing a reference signal configuration applied during the time interval, and wherein the data further comprises the reference signal array; or obtain a reference signal array representing a reference signal configuration applied during the time interval and compute a channel estimate based on the data array and the reference signal array, and wherein the data further comprises the channel estimate.

10. The radio receiver according to claim 9, wherein the reference signal array comprises a plurality of channels, wherein a channel corresponds to a layer of a multiple-input and multiple-output transmission.

11. The radio receiver according to claim 1, wherein the instructions, when executed with the at least one processor, cause the radio receiver to:

receive raw data using a plurality of samples during the time interval; and perform a Fourier transform on the received raw data, producing the data array.

12. A client device comprising the radio receiver according to claim 1.

13. A network node device comprising the radio receiver according to claim 1.

14. A method, comprising:

obtaining a data array comprising a plurality of elements, wherein an element in the plurality of elements in the data array corresponds to a subcarrier in a plurality of subcarriers, to a timeslot in a time interval, and to an antenna stream;

implementing a machine learning model comprising at least one neural network and a transformation, wherein the transformation comprises at least one multiplicative layer to multiply together elements in the data array, wherein the multiplicative layer is trained in conjunction with the at least one neural network of the machine learning model, and wherein output of the multiplicative layer functions as input for the at least one neural network; and inputting data into the machine learning model, wherein the data comprises at least the data array;

wherein the machine learning model is configured to, based on the input data, output an output array representing values of the plurality of elements in the data array, wherein the values comprise bits or symbols.

15. A non-transitory program storage device readable with an apparatus, tangibly embodying a program of instructions executable with the apparatus for performing:

obtaining a data array comprising a plurality of elements, wherein an element in the plurality of elements in the data array corresponds to a subcarrier in a plurality of subcarriers, to a timeslot in a time interval, and to an antenna stream;

implementing a machine learning model comprising at least one neural network and a transformation, wherein the transformation comprises at least one multiplicative layer to multiply together elements in the data array, wherein the multiplicative layer is trained in conjunction with the at least one neural network of the machine learning model, and wherein output of the multiplicative layer functions as input for the at least one neural network; and inputting data into the machine learning model, wherein the data comprises at least the data array;

wherein the machine learning model is configured to, based on the input data, output an output array representing values of the plurality of elements in the data array, wherein the values comprise bits or symbols.

* * * * *